US012782568B1

(12) United States Patent
Tran et al.

(10) Patent No.: US 12,782,568 B1
(45) Date of Patent: Nov. 3, 2026

(54) ENHANCING LIGHT SOURCE STABILITY IN INTEGRATED LIDAR SYSTEMS

(71) Applicant: SiLC Technologies, Inc., Monrovia, CA (US)

(72) Inventors: Ricky Tran, San Gabriel, CA (US); Chen Chen, Arcadia, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 1265 days.

(21) Appl. No.: 17/364,786

(22) Filed: Jun. 30, 2021

(51) Int. Cl.
*G01S 17/58* (2006.01)
*G01S 7/481* (2006.01)
*G01S 17/06* (2006.01)
*G02B 6/42* (2006.01)

(52) U.S. Cl.
CPC ............ *G01S 17/58* (2013.01); *G01S 7/4814* (2013.01); *G01S 17/06* (2013.01); *G02B 6/4207* (2013.01)

(58) Field of Classification Search
CPC ........ G01S 17/58; G01S 7/4814; G01S 17/06; G01S 7/48; G02B 6/4207
See application file for complete search history.

(56) References Cited

U.S. PATENT DOCUMENTS

| | | | |
|---|---|---|---|
| 4,262,993 | A | 4/1981 | Burns et al. |
| 4,472,020 | A | 9/1984 | Evanchuk |
| 4,523,803 | A | 6/1985 | Arao et al. |
| 4,786,132 | A | 11/1988 | Gordon |
| 4,845,703 | A | 7/1989 | Suzuki |
| 4,914,665 | A | 4/1990 | Sorin |
| 4,955,028 | A | 9/1990 | Alfeness et al. |
| 4,987,832 | A | 1/1991 | Klink et al. |
| 4,995,720 | A | 2/1991 | Amzajerdian |
| 5,041,832 | A | 8/1991 | Gulczynski |
| 5,194,906 | A | 3/1993 | Kimura et al. |

(Continued)

FOREIGN PATENT DOCUMENTS

| | | | |
|---|---|---|---|
| CN | 1668939 | A | 9/2005 |
| CN | 101356450 | A | 1/2009 |

(Continued)

OTHER PUBLICATIONS

Aalto, Timo Eta L., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

(Continued)

*Primary Examiner* — Yuqing Xiao
(74) *Attorney, Agent, or Firm* — Gavrilovich, Dodd & Lindsey LLP

(57) ABSTRACT

A LIDAR system includes a light source configured to output a source signal. The LIDAR chip is also configured to output a LIDAR output signal that exits from the LIDAR chip. The LIDAR system also includes an isolator adapter that includes an optical isolator configured to receive an adapter signal. The adapter signal includes light that is from the source signal and that has exited from the LIDAR chip before being received by the optical isolator. The isolator is configured to output light from the adapter signal in an isolator output signal. Additionally, the LIDAR output signal includes light from the isolator output signal.

16 Claims, 16 Drawing Sheets

(56) References Cited

U.S. PATENT DOCUMENTS

| | | | | |
|---|---|---|---|---|
| 5,289,252 | A | 2/1994 | Nourrcier | |
| 5,305,412 | A | 4/1994 | Paoli | |
| 5,323,223 | A | 6/1994 | Hayes | |
| 5,396,328 | A | 3/1995 | Jestel et al. | |
| 5,500,910 | A | 3/1996 | Boudreau et al. | |
| 5,847,816 | A | 12/1998 | Zediker et al. | |
| 5,889,490 | A | 3/1999 | Wachter et al. | |
| 5,953,468 | A | 9/1999 | Finnila et al. | |
| 5,977,538 | A | 11/1999 | Unger et al. | |
| 5,995,810 | A | 11/1999 | Karasawa | |
| 6,035,083 | A | 3/2000 | Brennan, III et al. | |
| 6,040,898 | A | 3/2000 | Mrosik et al. | |
| 6,108,472 | A | 8/2000 | Rickman et al. | |
| 6,400,500 | B1 | 6/2002 | Tidmarsh et al. | |
| 6,480,513 | B1 | 11/2002 | Kapany et al. | |
| 6,556,759 | B2 | 4/2003 | Roberts et al. | |
| 6,567,573 | B1 | 5/2003 | Domash et al. | |
| 6,687,010 | B1 | 2/2004 | Horri et al. | |
| 6,921,490 | B1 | 7/2005 | Qian et al. | |
| 6,959,133 | B2 | 10/2005 | Vancoill et al. | |
| 6,970,621 | B1 | 11/2005 | Fried | |
| 6,977,502 | B1 | 12/2005 | Hertz | |
| 7,345,744 | B2 | 3/2008 | Halmos et al. | |
| 7,375,877 | B1 | 5/2008 | Di Teodoro et al. | |
| 7,535,390 | B2 | 5/2009 | Hsu | |
| 7,907,333 | B2 | 3/2011 | Coyle | |
| 8,165,433 | B2 | 4/2012 | Jenkins et al. | |
| 8,213,751 | B1 | 7/2012 | Ho et al. | |
| 8,311,374 | B2 | 11/2012 | Hochberg et al. | |
| 8,326,100 | B2 | 12/2012 | Chen et al. | |
| 8,410,566 | B2 | 4/2013 | Qian et al. | |
| 8,541,744 | B1 | 9/2013 | Liu | |
| 8,558,993 | B2 | 10/2013 | Newbury et al. | |
| 8,885,678 | B1 | 11/2014 | Kupershmidt | |
| 9,157,790 | B2 | 10/2015 | Shpunt et al. | |
| 9,176,282 | B2 | 11/2015 | Pottier et al. | |
| 9,217,831 | B1 | 12/2015 | Asghari | |
| 9,235,097 | B2 | 1/2016 | Meade et al. | |
| 9,310,471 | B2 | 4/2016 | Sayyah et al. | |
| 9,310,487 | B2 | 4/2016 | Sakimura et al. | |
| 9,519,052 | B2 | 12/2016 | Gusev | |
| 9,575,341 | B2 | 2/2017 | Heck et al. | |
| 9,606,234 | B2 | 3/2017 | Major, Jr. et al. | |
| 9,625,580 | B2 | 4/2017 | Kotelnikov et al. | |
| 9,735,885 | B1 | 8/2017 | Sayyah et al. | |
| 9,740,079 | B1 | 8/2017 | Davids et al. | |
| 9,748,726 | B1 | 8/2017 | Morton et al. | |
| 9,753,351 | B2 | 9/2017 | Eldada | |
| 9,778,363 | B2 | 10/2017 | Kadambi et al. | |
| 9,798,166 | B1 | 10/2017 | Sharma et al. | |
| 9,823,118 | B2 | 11/2017 | Doylend et al. | |
| 9,841,495 | B2 | 12/2017 | Campbell et al. | |
| 9,851,443 | B2 | 12/2017 | Chen | |
| 9,857,468 | B1 | 1/2018 | Eichenholz et al. | |
| 9,893,737 | B1 | 2/2018 | Keramat et al. | |
| 10,003,168 | B1 | 6/2018 | Villeneuve | |
| 10,007,060 | B1 | 6/2018 | Qian et al. | |
| 10,094,916 | B1 | 10/2018 | Droz et al. | |
| 10,137,903 | B2 | 11/2018 | Tascione et al. | |
| 10,222,474 | B1 | 3/2019 | Raring et al. | |
| 10,274,599 | B2 | 4/2019 | Schmalenberg | |
| 10,281,322 | B2 | 5/2019 | Doylend et al. | |
| 10,345,447 | B1 | 7/2019 | Hicks | |
| 10,345,497 | B2 | 7/2019 | Wu et al. | |
| 10,397,019 | B2 | 8/2019 | Hartung et al. | |
| 10,564,268 | B2 | 2/2020 | Turbide et al. | |
| 10,605,901 | B2 | 3/2020 | Lee et al. | |
| 10,627,496 | B2 | 4/2020 | Schmalenberg et al. | |
| 10,649,306 | B2 | 5/2020 | Skirlo et al. | |
| 10,739,256 | B1 | 8/2020 | Rickman et al. | |
| 10,761,195 | B2 | 9/2020 | Donovan | |
| 10,782,782 | B1 | 9/2020 | DeSalvo et al. | |
| 10,788,582 | B2 | 9/2020 | Feng et al. | |
| 10,816,649 | B1 | 10/2020 | Keyser et al. | |
| 10,845,480 | B1 | 11/2020 | Shah et al. | |
| 10,901,074 | B1 | 1/2021 | Pan et al. | |
| 10,962,713 | B2 | 3/2021 | Lee | |
| 11,022,683 | B1 | 6/2021 | Rezk | |
| 11,067,668 | B1 | 7/2021 | Bravo | |
| 11,114,815 | B1 | 9/2021 | Chen et al. | |
| 11,119,219 | B1 * | 9/2021 | LaChapelle .............. | G02B 6/12 |
| 11,162,789 | B2 | 11/2021 | Lodin et al. | |
| 11,170,476 | B1 | 11/2021 | Toshiwal et al. | |
| 11,175,388 | B1 | 11/2021 | Wood et al. | |
| 11,221,404 | B1 | 1/2022 | DeSalvo et al. | |
| 11,300,683 | B2 | 4/2022 | Bao et al. | |
| 11,378,691 | B2 * | 7/2022 | Boloorian ............... | G01S 17/34 |
| 11,448,729 | B2 | 9/2022 | Baba et al. | |
| 11,454,724 | B2 | 9/2022 | Michaels et al. | |
| 11,486,975 | B1 | 11/2022 | Xiao | |
| 11,493,753 | B1 | 11/2022 | Wood et al. | |
| 11,525,916 | B2 | 12/2022 | Avci et al. | |
| 11,536,805 | B2 | 12/2022 | Asghari et al. | |
| 11,579,300 | B1 | 2/2023 | Li | |
| 11,635,491 | B2 * | 4/2023 | Asghari .................. | G01S 17/58 356/4.01 |
| 11,714,167 | B2 * | 8/2023 | Feng ....................... | G01S 17/58 356/5.01 |
| 11,768,419 | B1 | 9/2023 | Schroder et al. | |
| 11,815,720 | B1 | 11/2023 | Tavallaee et al. | |
| 11,908,075 | B2 | 2/2024 | Gorantla | |
| 2002/0031304 | A1 | 3/2002 | Roberts et al. | |
| 2002/0105632 | A1 | 8/2002 | Holton | |
| 2002/0122398 | A1 | 9/2002 | Jou | |
| 2002/0159700 | A1 | 10/2002 | Coroy et al. | |
| 2003/0030582 | A1 | 2/2003 | Vickers | |
| 2003/0031407 | A1 | 2/2003 | Weisberg et al. | |
| 2003/0142943 | A1 | 7/2003 | Yegnanarayanan et al. | |
| 2003/0183603 | A1 | 10/2003 | Forsman et al. | |
| 2003/0212520 | A1 | 11/2003 | Campos et al. | |
| 2003/0231686 | A1 | 12/2003 | Liu | |
| 2004/0081388 | A1 | 4/2004 | Koyama | |
| 2004/0085612 | A1 | 5/2004 | Livingston et al. | |
| 2004/0233964 | A1 | 11/2004 | Yamanaka et al. | |
| 2004/0249561 | A1 | 12/2004 | Capozzi et al. | |
| 2005/0123227 | A1 | 6/2005 | Vonsovici et al. | |
| 2005/0135730 | A1 | 6/2005 | Welch et al. | |
| 2005/0213103 | A1 | 9/2005 | Everett et al. | |
| 2005/0219068 | A1 | 10/2005 | Jones et al. | |
| 2005/0237617 | A1 | 10/2005 | Carr et al. | |
| 2005/0244103 | A1 | 11/2005 | Kwakernaak | |
| 2006/0114447 | A1 | 6/2006 | Harris et al. | |
| 2006/0232763 | A1 | 10/2006 | Jokinen | |
| 2007/0024849 | A1 | 2/2007 | Carrig et al. | |
| 2007/0024956 | A1 * | 2/2007 | Coyle ..................... | G01S 7/484 359/333 |
| 2007/0036486 | A1 | 2/2007 | Miyadera et al. | |
| 2007/0103362 | A1 | 5/2007 | Arikan et al. | |
| 2007/0171407 | A1 | 7/2007 | Cole et al. | |
| 2007/0223856 | A1 | 9/2007 | Nunoya et al. | |
| 2008/0088184 | A1 | 4/2008 | Tung et al. | |
| 2008/0123170 | A1 | 5/2008 | Reichert et al. | |
| 2008/0174461 | A1 | 7/2008 | Hsu | |
| 2008/0176681 | A1 | 7/2008 | Donahoe | |
| 2008/0181550 | A1 | 7/2008 | Earnshaw | |
| 2008/0205461 | A1 | 8/2008 | Henrichs | |
| 2009/0046746 | A1 | 2/2009 | Munroe et al. | |
| 2009/0128797 | A1 | 5/2009 | Walsh | |
| 2009/0195769 | A1 | 8/2009 | Luo et al. | |
| 2009/0279070 | A1 | 11/2009 | Ueno | |
| 2010/0027379 | A1 | 2/2010 | Saulnier et al. | |
| 2010/0085992 | A1 | 4/2010 | Rakuljic et al. | |
| 2010/0159858 | A1 | 6/2010 | Dent et al. | |
| 2010/0187442 | A1 | 7/2010 | Hochberg et al. | |
| 2010/0271614 | A1 | 10/2010 | Albuquerque et al. | |
| 2010/0277714 | A1 | 11/2010 | Pedersen et al. | |
| 2010/0280765 | A1 | 11/2010 | Marquardt et al. | |
| 2010/0296077 | A1 | 11/2010 | Scott et al. | |
| 2010/0309391 | A1 | 12/2010 | Plut | |
| 2011/0026643 | A1 | 2/2011 | Ruelke et al. | |
| 2011/0068425 | A1 | 3/2011 | Liao et al. | |
| 2011/0068426 | A1 | 3/2011 | Zheng et al. | |
| 2011/0091155 | A1 | 4/2011 | Yilmaz et al. | |
| 2011/0095167 | A1 | 4/2011 | Feng et al. | |

(56) References Cited

U.S. PATENT DOCUMENTS

2011/0141471 A1 6/2011 Schlotterbeck et al.
2011/0164845 A1 7/2011 Jenkins et al.
2011/0241895 A1 10/2011 Griffin
2012/0038506 A1 2/2012 Kanamoto et al.
2012/0062230 A1 3/2012 Vaughan, Jr. et al.
2012/0081786 A1 4/2012 Mizuyama et al.
2012/0098935 A1 4/2012 Schmidt et al.
2012/0120382 A1 5/2012 Silny et al.
2012/0182544 A1 7/2012 Asahara et al.
2012/0206712 A1 8/2012 Chang et al.
2013/0044309 A1 2/2013 Dakin et al.
2013/0044311 A1 2/2013 Rakuljic
2013/0051655 A1 2/2013 Collard et al.
2013/0056623 A1 3/2013 Lipson et al.
2013/0083389 A1 4/2013 Dakin et al.
2013/0094074 A1 4/2013 Asghari et al.
2013/0162976 A1 6/2013 Dakin et al.
2013/0206967 A1 8/2013 Shpunt et al.
2013/0242400 A1 9/2013 Chen
2013/0321791 A1 12/2013 Feldkhun et al.
2014/0035776 A1 2/2014 Sochen et al.
2014/0036252 A1 2/2014 Amzajerdian et al.
2014/0054451 A1 2/2014 Abedin et al.
2014/0112357 A1 4/2014 Abedin et al.
2014/0133864 A1 5/2014 Asghari et al.
2014/0153931 A1 6/2014 Doerr
2014/0169392 A1 6/2014 Kim
2014/0211298 A1 7/2014 Sayyah et al.
2014/0269790 A1 9/2014 Sebastian et al.
2014/0332918 A1 11/2014 Li et al.
2014/0376000 A1 12/2014 Swanson et al.
2014/0376001 A1 12/2014 Swanson
2015/0055115 A1 2/2015 Pedersen et al.
2015/0056740 A1 2/2015 Menezo
2015/0109603 A1 4/2015 Kim et al.
2015/0171593 A1 6/2015 Duan et al.
2015/0177367 A1 6/2015 Sebastian et al.
2015/0177383 A1 6/2015 Ruff et al.
2015/0185244 A1 7/2015 Inoue et al.
2015/0207296 A1 7/2015 Rickman et al.
2015/0333480 A1 11/2015 Santis et al.
2015/0346340 A1 12/2015 Yaacobi et al.
2015/0378012 A1 12/2015 Sayyah et al.
2015/0378187 A1 12/2015 Heck et al.
2016/0084945 A1 3/2016 Rodrigo et al.
2016/0161600 A1 6/2016 Eldada et al.
2016/0170141 A1 6/2016 Luo et al.
2016/0209594 A1 7/2016 Bahl
2016/0223663 A1 8/2016 Schmalenberg et al.
2016/0261091 A1 9/2016 Santis et al.
2016/0274226 A1 9/2016 Lewis
2016/0290891 A1 10/2016 Feng et al.
2016/0291135 A1 10/2016 Ando et al.
2016/0299228 A1 10/2016 Maleki et al.
2016/0306043 A1 10/2016 Moss et al.
2016/0324438 A1 11/2016 Halpern et al.
2016/0341818 A1 11/2016 Gilliland et al.
2016/0373191 A1 12/2016 Fathololoumi et al.
2016/0377721 A1 12/2016 Lardin et al.
2017/0003451 A1 1/2017 Ma et al.
2017/0040775 A1 2/2017 Takabayashi et al.
2017/0059779 A1 3/2017 Okayama
2017/0067985 A1 3/2017 Schwarz et al.
2017/0098917 A1 4/2017 Popovic et al.
2017/0108649 A1 4/2017 Dallessasse et al.
2017/0139411 A1 5/2017 Hartung et al.
2017/0146639 A1 5/2017 Carothers
2017/0146641 A1 5/2017 Walsh et al.
2017/0153319 A1 6/2017 Villeneuve et al.
2017/0155225 A1 6/2017 Villeneuve et al.
2017/0184450 A1 6/2017 Doylend et al.
2017/0207600 A1 7/2017 Klamkin et al.
2017/0268866 A1 9/2017 Berz
2017/0269198 A1 9/2017 Hall et al.
2017/0269215 A1 9/2017 Hall et al.
2017/0299697 A1* 10/2017 Swanson ............ G02B 6/29302
2017/0307648 A1 10/2017 Kotake et al.
2017/0307736 A1 10/2017 Donovan
2017/0328988 A1 11/2017 Magee et al.
2017/0343652 A1 11/2017 de Mersseman et al.
2017/0343791 A1 11/2017 Swanson
2017/0350965 A1 12/2017 Schmalenberg
2017/0350983 A1 12/2017 Hall et al.
2017/0356983 A1 12/2017 Jeong et al.
2017/0371227 A1 12/2017 Skirlo et al.
2017/0372602 A1 12/2017 Gilliland et al.
2018/0003805 A1 1/2018 Popovich et al.
2018/0024232 A1 1/2018 Gilliland et al.
2018/0024246 A1 1/2018 Jeong et al.
2018/0031680 A1 2/2018 Lee et al.
2018/0039154 A1 2/2018 Hashemi et al.
2018/0050704 A1 2/2018 Tascione et al.
2018/0073932 A1 3/2018 Minet et al.
2018/0088211 A1 3/2018 Gill et al.
2018/0095284 A1 4/2018 Welch et al.
2018/0102442 A1 4/2018 Wang et al.
2018/0103431 A1 4/2018 Suh et al.
2018/0113216 A1 4/2018 Kremer et al.
2018/0120433 A1 5/2018 Eichenholz et al.
2018/0120436 A1 5/2018 Smits
2018/0136321 A1 5/2018 Verghese et al.
2018/0143322 A1 5/2018 Rosenzweig et al.
2018/0143374 A1 5/2018 Coolbaugh et al.
2018/0149752 A1 5/2018 Tadano
2018/0164408 A1 6/2018 Hall et al.
2018/0172918 A1 6/2018 Lane et al.
2018/0188371 A1 7/2018 Bao et al.
2018/0217471 A1 8/2018 Lee et al.
2018/0224547 A1 8/2018 Crouch et al.
2018/0231643 A1 8/2018 Lee et al.
2018/0269890 A1 9/2018 Ojeda
2018/0287343 A1 10/2018 Morrison et al.
2018/0306925 A1 10/2018 Hosseini et al.
2018/0329037 A1 11/2018 Bozchalooi et al.
2018/0331493 A1 11/2018 Lin et al.
2018/0351317 A1 12/2018 Vermeulen
2018/0356344 A1 12/2018 Yi
2018/0356522 A1 12/2018 Kikuchi et al.
2018/0359033 A1 12/2018 Xu et al.
2018/0364334 A1 12/2018 Xiang et al.
2018/0364336 A1 12/2018 Hosseini et al.
2018/0372517 A1 12/2018 Yao et al.
2018/0372530 A1 12/2018 Welle et al.
2018/0372870 A1 12/2018 Puglia
2018/0375284 A1 12/2018 Permogorov
2019/0004151 A1 1/2019 Abediasl et al.
2019/0011558 A1 1/2019 Crouch et al.
2019/0011559 A1 1/2019 Desai et al.
2019/0018110 A1 1/2019 Kremer et al.
2019/0018121 A1 1/2019 Sayyah et al.
2019/0018139 A1 1/2019 Sayyah et al.
2019/0018140 A1 1/2019 Sarkissian et al.
2019/0018144 A1 1/2019 Imaki et al.
2019/0018197 A1 1/2019 Boutami et al.
2019/0025094 A1 1/2019 Lewis et al.
2019/0025426 A1 1/2019 Satyan et al.
2019/0025431 A1 1/2019 Satyan et al.
2019/0027897 A1 1/2019 Wei et al.
2019/0033453 A1 1/2019 Crouch et al.
2019/0049569 A1 2/2019 Kim et al.
2019/0064329 A1 2/2019 Liu et al.
2019/0064332 A1 2/2019 Schmalenberg et al.
2019/0064358 A1 2/2019 Desai et al.
2019/0072651 A1 3/2019 Halmos et al.
2019/0072672 A1 3/2019 Yao
2019/0086514 A1 3/2019 Dussan et al.
2019/0086518 A1 3/2019 Halstig et al.
2019/0086550 A1 3/2019 Dussan et al.
2019/0096259 A1 3/2019 McQuillen et al.
2019/0101647 A1 4/2019 Feshali et al.
2019/0107623 A1 4/2019 Campbell et al.
2019/0120939 A1 4/2019 O'Keeffe
2019/0146074 A1 5/2019 Hjelmstad
2019/0146087 A1 5/2019 Mansur et al.

(56) References Cited

U.S. PATENT DOCUMENTS

| | | | |
|---|---|---|---|
| 2019/0146164 A1 | 5/2019 | Krichevsky | |
| 2019/0154816 A1 | 5/2019 | Hughes et al. | |
| 2019/0154832 A1 | 5/2019 | Maleki et al. | |
| 2019/0154835 A1 | 5/2019 | Maleki et al. | |
| 2019/0179012 A1 | 6/2019 | Heo | |
| 2019/0187269 A1 | 6/2019 | Tong et al. | |
| 2019/0204419 A1 | 7/2019 | Baba et al. | |
| 2019/0204441 A1 | 7/2019 | Feneyrou et al. | |
| 2019/0204443 A1 | 7/2019 | Yao et al. | |
| 2019/0250253 A1 | 8/2019 | Hung et al. | |
| 2019/0250396 A1 | 8/2019 | Blanche et al. | |
| 2019/0257924 A1 | 8/2019 | Li et al. | |
| 2019/0257927 A1 | 8/2019 | Yao | |
| 2019/0280453 A1 | 9/2019 | Gopinath et al. | |
| 2019/0293794 A1 | 9/2019 | Zhang et al. | |
| 2019/0302262 A1 | 10/2019 | Singer | |
| 2019/0302268 A1 | 10/2019 | Singer et al. | |
| 2019/0310372 A1 | 10/2019 | Crouch et al. | |
| 2019/0310377 A1 | 10/2019 | Lodin et al. | |
| 2019/0317195 A1 | 10/2019 | Sun et al. | |
| 2019/0331797 A1 | 10/2019 | Singer et al. | |
| 2019/0339388 A1 | 11/2019 | Crouch et al. | |
| 2019/0339389 A1 | 11/2019 | Russo et al. | |
| 2019/0341739 A1 | 11/2019 | Loh et al. | |
| 2019/0346056 A1 | 11/2019 | Staiger et al. | |
| 2019/0346568 A1 | 11/2019 | Feng et al. | |
| 2019/0353787 A1 | 11/2019 | Petit | |
| 2019/0353789 A1 | 11/2019 | Boloorian et al. | |
| 2019/0353977 A1 | 11/2019 | Hung | |
| 2019/0361122 A1 | 11/2019 | Crouch et al. | |
| 2019/0369244 A1 | 12/2019 | Asghari et al. | |
| 2019/0369251 A1 | 12/2019 | Feng et al. | |
| 2019/0372307 A1 | 12/2019 | Morton | |
| 2019/0383907 A1 | 12/2019 | Belsley et al. | |
| 2019/0391242 A1 | 12/2019 | Asghari et al. | |
| 2019/0391243 A1 | 12/2019 | Nicolaescu | |
| 2020/0018857 A1 | 1/2020 | Feng et al. | |
| 2020/0021082 A1 | 1/2020 | Rakuljic | |
| 2020/0025898 A1 | 1/2020 | Ain-Kedem et al. | |
| 2020/0025926 A1 | 1/2020 | Asghari et al. | |
| 2020/0043176 A1 | 2/2020 | Maila et al. | |
| 2020/0049799 A1 | 2/2020 | Ando et al. | |
| 2020/0049801 A1* | 2/2020 | Sayyah | G01S 17/34 |
| 2020/0057143 A1 | 2/2020 | Asghari et al. | |
| 2020/0064116 A1 | 2/2020 | Salvade et al. | |
| 2020/0064477 A1 | 2/2020 | Komatsuzaki | |
| 2020/0072978 A1 | 3/2020 | Boloorian et al. | |
| 2020/0072979 A1 | 3/2020 | Boloorian et al. | |
| 2020/0076152 A1 | 3/2020 | Eichenholz et al. | |
| 2020/0088876 A1 | 3/2020 | Tanemura et al. | |
| 2020/0103501 A1 | 4/2020 | Kotelnikov et al. | |
| 2020/0104647 A1 | 4/2020 | Pirim | |
| 2020/0110179 A1 | 4/2020 | Talty et al. | |
| 2020/0116837 A1 | 4/2020 | Asghari et al. | |
| 2020/0116842 A1 | 4/2020 | Asghari et al. | |
| 2020/0116863 A1 | 4/2020 | Jensen et al. | |
| 2020/0142065 A1 | 5/2020 | Boloorian et al. | |
| 2020/0142066 A1 | 5/2020 | Sandborn et al. | |
| 2020/0142068 A1 | 5/2020 | Crouch et al. | |
| 2020/0150241 A1 | 5/2020 | Byrnes et al. | |
| 2020/0158830 A1 | 5/2020 | Asghari et al. | |
| 2020/0158833 A1 | 5/2020 | Baba et al. | |
| 2020/0158839 A1 | 5/2020 | Lin et al. | |
| 2020/0166617 A1 | 5/2020 | Crouch et al. | |
| 2020/0166647 A1 | 5/2020 | Crouch et al. | |
| 2020/0174095 A1 | 6/2020 | Altintas et al. | |
| 2020/0182973 A1* | 6/2020 | Luff | G01S 17/06 |
| 2020/0182978 A1 | 6/2020 | Maleki et al. | |
| 2020/0200879 A1 | 6/2020 | Halstig et al. | |
| 2020/0209366 A1 | 7/2020 | Maleki | |
| 2020/0225332 A1 | 7/2020 | Wagner et al. | |
| 2020/0241119 A1 | 7/2020 | Asghari et al. | |
| 2020/0249324 A1 | 8/2020 | Steinberg et al. | |
| 2020/0249350 A1 | 8/2020 | Schmalenberg | |
| 2020/0256956 A1 | 8/2020 | Luff et al. | |
| 2020/0278432 A1 | 9/2020 | Thorpe et al. | |
| 2020/0284879 A1 | 9/2020 | Asghari et al. | |
| 2020/0284883 A1 | 9/2020 | Ferreira et al. | |
| 2020/0284913 A1 | 9/2020 | Amelot et al. | |
| 2020/0292706 A1 | 9/2020 | Hexsel et al. | |
| 2020/0300980 A1 | 9/2020 | Behzadi et al. | |
| 2020/0300993 A1 | 9/2020 | Behzadi et al. | |
| 2020/0301070 A1 | 9/2020 | Nagarajan | |
| 2020/0309949 A1 | 10/2020 | Feng et al. | |
| 2020/0309952 A1 | 10/2020 | Imaki et al. | |
| 2020/0319409 A1 | 10/2020 | Su et al. | |
| 2020/0326476 A1 | 10/2020 | Hiratani | |
| 2020/0333441 A1 | 10/2020 | Diaz | |
| 2020/0333443 A1 | 10/2020 | Boloorian et al. | |
| 2020/0333533 A1 | 10/2020 | Rogers et al. | |
| 2020/0363515 A1 | 11/2020 | Luff et al. | |
| 2020/0400821 A1 | 12/2020 | Baker et al. | |
| 2020/0400822 A1 | 12/2020 | Ando et al. | |
| 2020/0408911 A1 | 12/2020 | Boloorian et al. | |
| 2020/0408912 A1 | 12/2020 | Boloorian et al. | |
| 2021/0010802 A1 | 1/2021 | Onohara et al. | |
| 2021/0033732 A1 | 2/2021 | Boloorian et al. | |
| 2021/0055388 A1* | 2/2021 | Feng | G01S 7/4812 |
| 2021/0063541 A1 | 3/2021 | Zheng et al. | |
| 2021/0063542 A1 | 3/2021 | Zheng et al. | |
| 2021/0072385 A1 | 3/2021 | Sandborn et al. | |
| 2021/0072389 A1 | 3/2021 | Boloorian et al. | |
| 2021/0072445 A1 | 3/2021 | Kurokawa et al. | |
| 2021/0096228 A1 | 4/2021 | Behzadi et al. | |
| 2021/0109195 A1 | 4/2021 | Feng et al. | |
| 2021/0116778 A1 | 4/2021 | Zhang et al. | |
| 2021/0132232 A1 | 5/2021 | Asghari et al. | |
| 2021/0141058 A1 | 5/2021 | Piggott et al. | |
| 2021/0149056 A1 | 5/2021 | Luff et al. | |
| 2021/0156999 A1 | 5/2021 | Nishino et al. | |
| 2021/0159659 A1 | 5/2021 | Bandyopadhyay et al. | |
| 2021/0159664 A1 | 5/2021 | Liu et al. | |
| 2021/0165102 A1 | 6/2021 | Crouch et al. | |
| 2021/0173058 A1 | 6/2021 | Viswanatha et al. | |
| 2021/0181320 A1 | 6/2021 | Oza et al. | |
| 2021/0190907 A1 | 6/2021 | Sahara | |
| 2021/0190921 A1 | 6/2021 | Golikov et al. | |
| 2021/0190925 A1 | 6/2021 | Asghari et al. | |
| 2021/0199797 A1 | 7/2021 | Choi et al. | |
| 2021/0239811 A1 | 8/2021 | Asghari et al. | |
| 2021/0255324 A1 | 8/2021 | Dunn et al. | |
| 2021/0278540 A1 | 9/2021 | Maayan et al. | |
| 2021/0293923 A1 | 9/2021 | Arkind et al. | |
| 2021/0318436 A1 | 10/2021 | Boloorian et al. | |
| 2021/0325520 A1 | 10/2021 | Cai et al. | |
| 2021/0333386 A1 | 10/2021 | Park et al. | |
| 2021/0349196 A1 | 11/2021 | Wang et al. | |
| 2021/0349216 A1 | 11/2021 | Behroozpour et al. | |
| 2021/0356592 A1* | 11/2021 | Behroozpour | G01S 7/4917 |
| 2021/0373162 A1 | 12/2021 | Wu et al. | |
| 2021/0389244 A1 | 12/2021 | Bowman et al. | |
| 2021/0396879 A1 | 12/2021 | Sun et al. | |
| 2021/0405194 A1 | 12/2021 | Tsuchida | |
| 2022/0003842 A1 | 1/2022 | Wang et al. | |
| 2022/0050187 A1 | 2/2022 | Yao | |
| 2022/0065999 A1 | 3/2022 | Phare et al. | |
| 2022/0075121 A1 | 3/2022 | Lowder et al. | |
| 2022/0085567 A1 | 3/2022 | Lowder et al. | |
| 2022/0099837 A1 | 3/2022 | Crouch et al. | |
| 2022/0107411 A1 | 4/2022 | Koonath et al. | |
| 2022/0113390 A1 | 4/2022 | Koonath et al. | |
| 2022/0113422 A1 | 4/2022 | Hillard et al. | |
| 2022/0121080 A1 | 4/2022 | Yao | |
| 2022/0179055 A1 | 6/2022 | Ferrara et al. | |
| 2022/0187457 A1 | 6/2022 | Daami et al. | |
| 2022/0187458 A1 | 6/2022 | Piggott et al. | |
| 2022/0187463 A1 | 6/2022 | Maheshwari et al. | |
| 2022/0196814 A1 | 6/2022 | Lin et al. | |
| 2022/0206164 A1 | 6/2022 | Takada | |
| 2022/0244360 A1 | 8/2022 | Phare et al. | |
| 2022/0283389 A1 | 9/2022 | Yang et al. | |
| 2022/0291361 A1 | 9/2022 | Asghari et al. | |
| 2022/0308192 A1 | 9/2022 | John et al. | |
| 2022/0334225 A1 | 10/2022 | Davydenko et al. | |

(56) References Cited

U.S. PATENT DOCUMENTS

2022/0342048 A1 10/2022 Asghari et al.
2022/0365214 A1 11/2022 Sandborn et al.
2022/0373667 A1 11/2022 Khatana et al.
2022/0404470 A1 12/2022 Asghari et al.
2022/0413100 A1* 12/2022 Jain ........................ G01S 7/4911
2022/0413143 A1 12/2022 Parsa et al.
2023/0027271 A1 1/2023 Jin et al.
2023/0069201 A1 3/2023 Asghari et al.
2023/0104453 A1 4/2023 Asghari et al.
2023/0194952 A1 6/2023 Muranaka et al.
2023/0228878 A1 7/2023 Asghari et al.
2023/0258861 A1 8/2023 Vercruysse et al.
2023/0288566 A1 9/2023 Nadkarni et al.
2023/0296732 A1 9/2023 Xiao
2025/0085401 A1 3/2025 Zhou et al.
2025/0094380 A1 3/2025 Mazed

FOREIGN PATENT DOCUMENTS

CN 103874945 A 6/2014
CN 104459881 A 3/2015
CN 204479750 U 7/2015
CN 105589074 A 5/2016
CN 105680320 A 6/2016
CN 105917257 A 8/2016
CN 106154248 A 11/2016
CN 106410607 A 2/2017
CN 106773028 A 5/2017
CN 106842232 A 6/2017
CN 106959439 A 7/2017
CN 107144847 A 9/2017
CN 107305184 A 10/2017
CN 107367734 A 11/2017
CN 107976666 A 5/2018
CN 108139465 A 6/2018
CN 108291970 A 7/2018
CN 108603758 A 9/2018
CN 109642952 A 4/2019
CN 110036276 A 7/2019
CN 107192355 B 8/2019
CN 110161516 A 8/2019
CN 110187350 A 8/2019
CN 110412685 A 11/2019
CN 111338025 A 6/2020
CN 112241014 A 1/2021
CN 114419152 A 4/2022
DE 10 2015 222061 A1 5/2017
DE 10 2017 200795 A1 7/2018
DE 10 2017 106 226 A1 9/2018
DE 102019124598 A1 3/2020
EP 0 523 921 A1 1/1993
EP 2796890 A1 10/2014
EP 2955542 B1 4/2017
EP 3276371 A1 1/2018
EP 3339924 A1 6/2018
EP 3259615 B1 11/2019
EP 3719537 A1 10/2020
EP 3 584 893 B1 6/2021
EP 3889644 A1 10/2021
GB 1 585 053 A 2/1981
GB 2173664 A 10/1986
GB 2586499 A 2/2021
JP S53-123004 A 10/1978
JP H05-158096 A 6/1993
JP H09-33872 A 2/1997
JP H1010227 A 1/1998
JP 2003224321 A 8/2003
JP 2004-151022 A 5/2004
JP 2007184511 A 7/2007
JP 2008160130 A 7/2008
JP 2008292370 A 12/2008
JP 2009-115696 A 5/2009
JP 2010151806 A 7/2010
JP 2010271624 A 12/2010
JP 2012146787 A 8/2012
JP 2013165407 A 8/2013
JP 2014202716 A 10/2014
JP 2015-018640 A 1/2015
JP 2015092184 A 5/2015
JP 2015-517094 A 6/2015
JP 2015172540 A 10/2015
JP 2015180735 A 10/2015
JP 2015230259 A 12/2015
JP 2016111087 A 6/2016
JP 2016-525209 A 8/2016
JP 5975203 B2 8/2016
JP 2017502315 A 1/2017
JP 2017097340 A 6/2017
JP 2017106897 A 6/2017
JP 2017524918 A 8/2017
JP 2017161484 A 9/2017
JP 2017-198514 A 11/2017
JP 2017-211348 A 11/2017
JP 2018511054 A 4/2018
JP 2018-512600 A 5/2018
JP 2018520346 A 7/2018
JP 2018529955 A 10/2018
JP 2018188284 A 11/2018
JP 2018200273 A 12/2018
JP 2019502925 A 1/2019
JP 2019095218 A 6/2019
JP 2019525195 A 9/2019
JP 2019-203977 A 11/2019
JP 2019-537012 A 12/2019
JP 2020-012641 A 1/2020
JP 2020-16639 A 1/2020
JP 2020-34546 A 3/2020
JP 2002090457 A 3/2020
JP 2020085723 A 6/2020
JP 2021004800 A 1/2021
JP 2021032848 A 3/2021
JP 7397009 A 12/2023
KR 20060086182 A 7/2006
KR 10-2015-0045735 A 4/2015
KR 20180013598 A 2/2018
KR 101 931 022 B1 12/2018
WO 97/11396 A1 3/1997
WO 2010123182 A1 10/2010
WO 2010127151 A1 11/2010
WO 2012123668 A1 9/2012
WO 2012153309 A2 11/2012
WO 2013/049579 A1 4/2013
WO 2014/203654 A1 12/2014
WO 2014/206630 A1 12/2014
WO 2015/044370 A1 4/2015
WO 2015/058209 A1 4/2015
WO 2015/098027 A1 7/2015
WO 2015/200800 A1 12/2015
WO 2016/024332 A1 2/2016
WO 2016/097409 A2 6/2016
WO 2017/023107 A1 2/2017
WO 2017/083597 A1 5/2017
WO 2017/095817 A1 6/2017
WO 2017/102156 A1 6/2017
WO 2017/187510 A1 11/2017
WO 2017/216581 A1 12/2017
WO 2018/003852 A1 1/2018
WO 2018/036946 A1 3/2018
WO 2018/060318 A1 4/2018
WO 2018/116412 A1 6/2018
WO 2018/160240 A2 9/2018
WO 2018/230474 A1 12/2018
WO 2019/010320 A1 1/2019
WO 2019/018894 A1 1/2019
WO 2019/121069 A1 6/2019
WO 2019/130472 A1 7/2019
WO 2019/149815 A1 8/2019
WO 2019/196135 A1 10/2019
WO 2019/217761 A1 11/2019
WO 2019/217857 A1 11/2019
WO 2019/236430 A1 12/2019
WO 2019/236464 A1 12/2019
WO 2020/005537 A1 1/2020
WO 2020/033161 A1 2/2020

(56) References Cited

FOREIGN PATENT DOCUMENTS

| | | | |
|---|---|---|---|
| WO | 2020/046513 | A1 | 3/2020 |
| WO | 2020/076566 | A1 | 4/2020 |
| WO | 2020/110779 | A1 | 6/2020 |
| WO | 2020/129284 | A1 | 6/2020 |
| WO | 2020/167515 | A1 | 8/2020 |
| WO | 2020/205450 | A1 | 10/2020 |
| WO | 2020/234797 | A1 | 11/2020 |
| WO | 2020/251633 | A1 | 12/2020 |
| WO | 2021/024038 | A1 | 2/2021 |
| WO | 2021/252894 | A1 | 12/2021 |
| WO | 2022/013422 | A1 | 1/2022 |
| WO | 2022/233503 | A1 | 11/2022 |
| WO | 2023/006470 | A1 | 2/2023 |
| WO | 2023/118295 | A1 | 6/2023 |

OTHER PUBLICATIONS

Anderson et al., "ladar: Frequency-Modulated Continuous Wave Laser Detection and Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

Guo et al., "Beat-frequency adjustable Er3+-doped DBR fiber laser for ultrasound detection", Optics Express, Jan. 31, 2011, vol. 19, No. 3, pp. 2485-2492.

Haran, T., "Short-wave infrared diffuse reflectance of Textile Materials", Thesis, Georgia State University, 2008.

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.

Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.

Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.

Kaasalainen, S., "The multispectral journey of Lidar", Retrieved from GIM International: https://www.gim-international.com/content/article/the-multispectral-journey-of-lidar, Jan. 24, 2019.

Kelly et al., "Discrete mode laser diodes with ultra narrow linewidthe emission" Feb. 2007, Electronics Letters, vol. 43, 2 pgs.

Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.

Komljenovic et al., "Widely-Tunable Ring-Resonator Semiconductor Lasers", Review, Jul. 17, 2017, 21 pages.

Kotthaus, S., et al., "Derivation of an urban materials spectral library through emittance and reflectance spectroscopy", ISPRS Journal of Photogrammetry and Remote Sensing, Aug. 2014, vol. 94, 194-212.

Kumar et al., "Intra-data center interconnects, networking, and architectures", Coherent Detection, Optical Fiber Telecommunications VII, Oct. 25, 2019, Science Direct, pp. 627-672.

Li, L., "Time-of-Flight Camera—An Introduction", 2014, TI Technical White Paper, SLOA190B.

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Lu, Z., "Silicon Photonic Switches for Optical Communication Applications", PhD Thesis. University of British Columbia, Sep. 29, 2017, 165 pages.

Nevlacsil et al., "Multi-channel swept source optical coherence tomography concept based on photonic integrated circuits", Optics Express, Oct. 26, 2020, vol. 28, No. 22, pp. 32468-32482.

PDB450C—Switchable Gain Balanced Amp. Photodetector, InGaAs. (n.d.). Retrieved from Thorlabs: https://www.thorlabs.com/thorproduct.cfm?partnumber=PDB450C.

Pfennigbauer, M. et al., "Multi-Wavelength Airborne Laser Scanning", ILMF 2011. New Orleans, Feb. 7-9, 2011.

PI Motion/Positioning, 2018, Retrieved from PI USA: http://www.pi-usa.us/products/PDF_Data/Q-522_Mini_Positioning_Stage_20150203.pdf.

PI USA: Fast Tip/Tilt Platform, 2018, Retrieved from PI USA Active Optics: http://www.pi-usa.us/products/PDF_Data/S335_Fast_Tip-Tilt_Platform.pdf.

Pierrottet et al., "Linear FMCW Laser Radar for Precision Range and Vector Velocity Measurements", MRS Online Proceeding Library Archive, Jan. 2008, pp. 1-9.

Pilot Photonics, Lyra OCS 1000, Optical comb laser module, Retrieved on Nov. 20, 2019 from Pilot Photonics: http://www.pilotphotonics.com/optical-frequency-comb-source/.

Poulton, C. V. MSC Thesis, "Integrated LIDAR with Optical Phased Arrays in Silicon Photonics", Massachusetts Institute of Technology, Sep. 2016, pp. 95-101.

Poulton, Christopher V. et al., "Coherent Solid-State LIDAR with Silicon Photonic Optical Phased Arrays", pp. 4091-4094, Oct. 15, 2017, Optics Letters, vol. 42, No. 20.

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9 (19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.

(56) References Cited

OTHER PUBLICATIONS

Sandborn, Phillip Alan McGinnis, "FMCW Lidar: Scaling to the Chip-Level and Improving Phase-Noise-Limited Performance", Fall 2017, 18 pages.
Satyan, N. et al., "Precise control of broadband frequency chirps using optoelectronic feedback," Optics Express, Aug. 31, 2009, vol. 17, No. 18, pp. 15991-15999.
Schulmeister, Karl, "White Paper The new edition of the international laser product safety standard", IEC 60825-1, 2014.
Self, "Focusing of spherical Gaussian beams", Applied Optics, Mar. 1, 1983, vol. 22, No. 5, pp. 658-661.
Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.
Smit, Meint K. C. v., "Phasar-Based WDM-Devices: Principles, Design and Applications", IEEE Journal of Selected Topics in Quantum Electronics, Jan. 1, 1996, 2(2), 236-250.
Soref, Richard A. et al. "Electrooptical Effects in Silicon", IEEE Journal of Quantum Electronics, vol. QE-23, No. 1, Jan. 1987, pp. 123-129.
Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.
Sun, J., et al., "Large-scale silicon photonic circuits for optical phased arrays," vol. 20, No. 4, Jul./Aug. 2014. IEEE Journal of Selected Topics in Quantum Electronics.
"The Demultiplexer" accessed from www.electronics-tutorials.ws/combination/comb_3.html with WayBack Machine dated Feb. 9, 2008, 2 pages.
Van Acoleyen et al., "Off-chip beam steering with a one-dimensional optical phased array on silicon-on-insulator", Apr. 2009, Opt. Lett., 34(9) 1477-1479.
Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.
Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.
Velodyne, "HDL-64E S2 Datasheet. Retrieved from http://velodynelidar.com/lidar/products/brochure/HDL-64E%20S2%20datasheet_2010_lowres.pdf", 2017.
Wang et al., "Automotive FMCW Radar-enhanced Range Estimation via a Local Resampling Fourier Transform", International Journal of Advanced Robotic Systems, May 15, 2016, pp. 1-8.
Wikipedia, Optical Attenuator, 2022, 3 pages.
Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.
Wojtkiewicz et al., "Two-dimensional signal processing in FMCW radars", National Conference on Circuit Theory and Electronic Networks, vol. 2, Oct. 1997, pp. 1-6.
Zhu et al., "Dual-Comb Ranging", Engineering, 4, Oct. 16, 2018, pp. 772-778.

* cited by examiner

ENHANCING LIGHT SOURCE STABILITY IN INTEGRATED LIDAR SYSTEMS

FIELD

The invention relates to optical devices. In particular, the invention relates to LIDAR systems.

BACKGROUND

LIDAR systems need a stable light source in order to provide reliable results. Integration of these of LIDAR systems onto a Photonic Integrated Circuit chip is highly desirable as it offers efficiencies in size, fabrication, and simplicity. However, integrating all of the components of a LIDAR system onto a single chip often requires optical components to be combined in a way that causes the light source to become unstable. As a result, there is a need for an integrated LIDAR system that retains a stabilized light source.

SUMMARY

A system includes a Photonic Integrated Circuit chip that includes integrated waveguides. The Photonic Integrated Circuit chip being configured to output a source signal. The system includes an isolator adapter that has an optical isolator configured to receive an adapter signal. The adapter signal includes light from the source signal that has exited from the Photonic Integrated Circuit chip before being received by the optical isolator. The isolator is configured to output light from the adapter signal in an isolator output signal. One or more of the waveguides on the Photonic Integrated Circuit chip are configured to receive a light signal that includes light from the isolator output signal.

A LIDAR system includes a light source configured to output a source signal. The LIDAR chip is also configured to output a LIDAR output signal that exits from the LIDAR chip. The LIDAR system also includes an isolator adapter that includes an optical isolator configured to receive an adapter signal. The adapter signal includes or consists of light from the source signal that has exited from the LIDAR chip before being received by the optical isolator. The isolator is configured to output light from the adapter signal in an isolator output signal. Additionally, the LIDAR output signal includes or consists of light from the isolator output signal.

BRIEF DESCRIPTION OF THE FIGURES

FIG. 15A is a topview of a portion of the LIDAR chip that includes the interface.

FIG. 15B is a cross section of the waveguide shown in FIG. 15A taken along the line labeled B.

FIG. 15C is a cross section of the gain chip taken along a line extending between the brackets labeled C in FIG. 15A.

FIG. 15D is a cross section of the gain chip taken along a line extending between the brackets labeled D in FIG. 15A.

FIG. 15E is a cross section of the gain chip of FIG. 15A taken along a line extending between the brackets labeled E in FIG. 15A.

FIG. 17C is a topview of the LIDAR system.

FIG. 17D is a sideview of a cross section of the system taken along a line extending through the brackets labeled B in FIG. 17C.

DESCRIPTION

Figure 1:
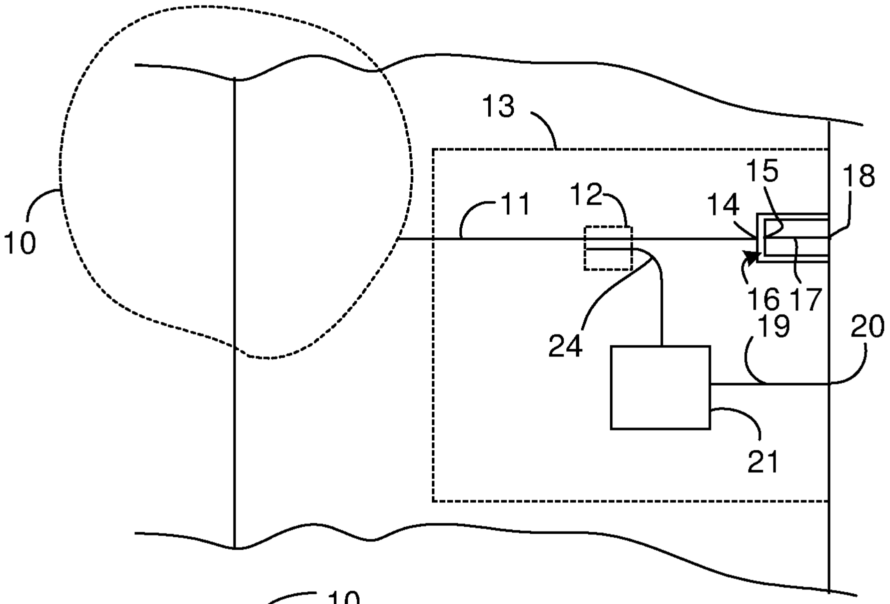
FIG. 1 is a topview of a schematic of a LIDAR chip that can serve as a LIDAR system or can be included in a LIDAR system that includes components in addition to the LIDAR chip.

The LIDAR system is configured to output a system output signal. The LIDAR system is also configured to receive a system return signal that includes light from the system output signal after the system output signal was reflected by an object located outside of the LIDAR system. The LIDAR system can include electronics that generate LIDAR data that indicates a distance and/or radial velocity between the LIDAR system and the object.

The LIDAR system includes a LIDAR chip that includes a Photonic Integrated Circuit (PIC). The LIDAR chip includes a light source that can be operated by the electronics so as to generate light carried in a source signal output from the light source. The LIDAR chip outputs a LIDAR output signal that includes light from the source signal. Additionally, the system output signal includes light from the LIDAR output signal. The LIDAR chip can also include an optical amplifier. The electronics can operate the amplifier so as to amplify the power of the LIDAR output signal and accordingly the system output signal.

When the light source and an amplifier are integrated on the same LIDAR chip, the amplifier can provide a high level of back reflection that travels back to the light source. LIDAR systems such as FMCW systems provide more reliable LIDAR data as the linewidth of the source signal decreases. As a result, the LIDAR chip can include a light source selected from the group consisting of Distributed Feedback lasers, Distributed Bragg Reflector lasers, Discrete Mode lasers, and an External Cavity laser. However, these light sources are more sensitive to back reflection than other light sources. Further, the level of back reflection that results from the presence of an amplifier integrated on the LIDAR chip is often enough to de-stabilize these light sources and reduce the reliability of the LIDAR data.

The LIDAR system can also include an isolator adapter that is separate from the LIDAR chip but is used in conjunction with the LIDAR chip. The isolator adapter includes an optical isolator configured to receive an adapter signal. The adapter signal includes or consists of light that is from the source signal and that has exited from the LIDAR chip before being received by the optical isolator. The isolator is configured to output light from the adapter signal in an isolator output signal. Additionally, the LIDAR output signal includes or consists of light from the isolator output signal. As a result, light from the source signal exits from the LIDAR chip, is received at the isolator, and then returns to the LIDAR chip before exiting the LIDAR chip in the LIDAR output signal.

The presence of the isolator stops or reduces the back-reflected light from reaching the light source. As a result, the light source remains stable. However, it has not been practical to integrate an optical isolator into Photonic Integrated Circuit (PIC) platform such as a silicon-on-insulator wafer. The use of an isolator adapter external to the LIDAR chip allows the LIDAR system to be highly integrated on the LIDAR chip while also stabilizing the light on the LIDAR chip. As a result, a highly integrated LIDAR system with light source stability has been achieved.

FIG. 1 is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light system 10 that outputs a light system signal. A suitable light system 10 includes, but is not limited to, semiconductor lasers such as External Cavity Lasers (ECLs), Distributed Feedback lasers (DFBs), Discrete Mode (DM) lasers, Quantum Dot (QD) lasers and Distributed Bragg Reflector lasers (DBRs).

The LIDAR chip includes a utility waveguide 11 that receives the light system signal from the light system 10. The utility waveguide 11 includes a splitter 12 that receives the light system signal. The splitter 12 outputs an outgoing LIDAR signal on the utility waveguide 11.

The utility waveguide 11 carries the outgoing LIDAR signal to a LIDAR engine 13 that processes the light signals from which the LIDAR data is generated. The LIDAR engine 13 includes a facet 14 at which the utility waveguide 11 terminates. The utility waveguide 11 carries the outgoing LIDAR signal to the facet 14.

The facet 14 is optically aligned with a first facet 15 of an optical amplifier 16. The optical amplifier includes an amplifier waveguide 17 that terminates at a second facet 18. The outgoing LIDAR signal passes through the facet 14 of the utility waveguide 11, through the first facet 15, and is received in the amplifier waveguide 17. The amplifier waveguide 17 carries the outgoing LIDAR signal to the second facet 18. The second facet 18 can be positioned such that the outgoing LIDAR signal traveling through the second facet 18 exits the chip and serves as a LIDAR output signal. For instance, the second facet 18 can be positioned at or near an edge of the LIDAR chip so the outgoing LIDAR signal traveling through the second facet 18 exits the chip and serves as a LIDAR output signal. The optical amplifier 16 is optional. As a result, the portion of the LIDAR output signal that passes through the facet 14 of the utility waveguide 11 can exit from the LIDAR chip and serve as the LIDAR output signal. In some instances, the portion of the LIDAR output signal that exits from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

Light from the LIDAR output signal travels away from the LIDAR system in the system output signal. The system output signal can travel through free space in the atmosphere in which the LIDAR system is positioned. The system output signal may be reflected by one or more objects in the path of the system output signal. When the system output signal is reflected, at least a portion of the reflected light travels back toward the LIDAR chip as a system return signal.

Light from the system return signal can be carried in a first LIDAR input signal that is received by the LIDAR chip. In some instances, a portion of the system return signal can serve as a first LIDAR input signal. The LIDAR engine 13 includes a comparative waveguide 19 that terminates at a facet 20. The first LIDAR input signals enters the comparative waveguide 19 through the facet 20 and serves as a first comparative signal. The comparative waveguide 19 carries the first comparative signal to a processing unit 21 configured to convert the optical signals to electrical signals from which LIDAR data (the radial velocity and/or distance between the LIDAR system and one or more objects located outside of the LIDAR system) is generated.

The splitter 12 moves a portion of the light system signal from the utility waveguide 11 onto a reference waveguide 24 as a first reference signal. The reference waveguide 24 carries the first reference signal to the processing unit 21 for further processing.

The percentage of light transferred from the utility waveguide 11 by the splitter 12 can be fixed or substantially fixed. For instance, the splitter 12 can be configured such that the power of the first reference signal transferred to the reference waveguide 24 is a percentage of the power of the light system signal. In some instances, the percentage is greater than 5%, 10% or 20 and/or less than 50%, or 60%. Suitable splitters 12 include, but are not limited to, optical couplers, y-junctions, tapered couplers, and Multi-Mode Interference (MMI) devices.

Figure 2:
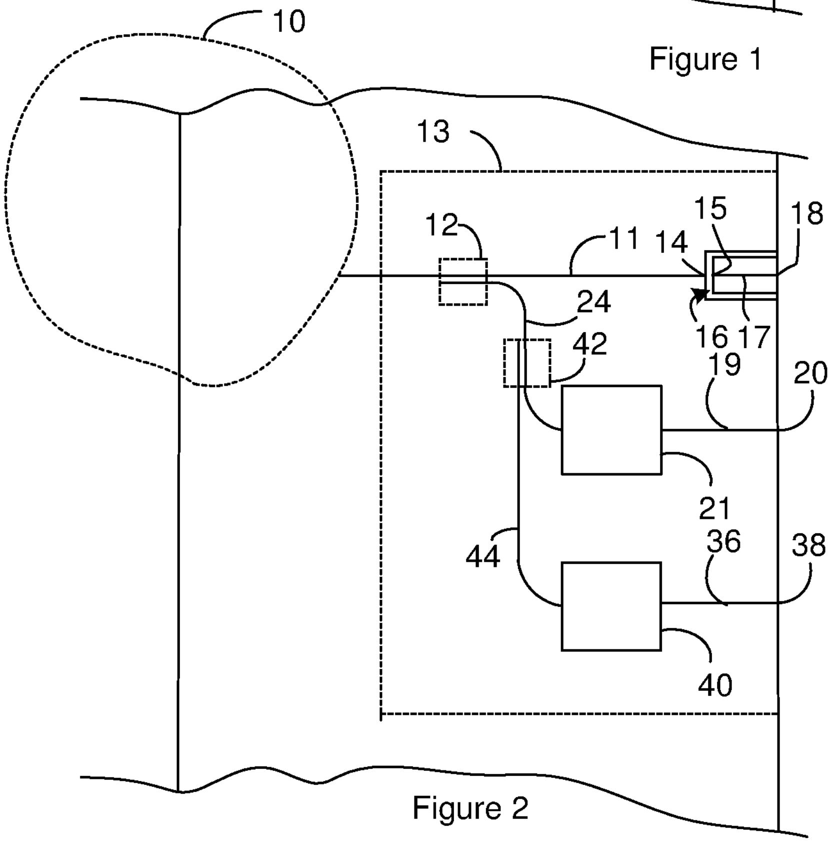
FIG. 2 is a topview of a schematic of another embodiment of a LIDAR chip that can serve as a LIDAR system or can be included in a LIDAR system that includes components in addition to the LIDAR chip.

FIG. 2 is a topview of a schematic of a LIDAR chip that can serve as a LIDAR system or can be included in a LIDAR system that includes components in addition to the LIDAR chip. The LIDAR chip of FIG. 2 illustrates the LIDAR chip of FIG. 1 modified to process multiple LIDAR input signals. As noted above, when the light from the system output signal is reflected by an object located outside of the LIDAR system, at least a portion of the reflected light can travel back toward the LIDAR chip in the system return signal.

Light from the system return signal can be carried in a second system LIDAR input signal that is received by the LIDAR chip. In some instances, a portion of the system return signal can serve as a second LIDAR input signal. The LIDAR chip includes a second comparative waveguide 36 that terminates at a facet 38. The second LIDAR input signals enters the second comparative waveguide 36 through the facet 38 and serves as a second comparative signal. The second comparative waveguide 36 carries the second comparative signal to a second processing unit 40 configured to convert the optical signals to electrical signals from which LIDAR data (the radial velocity and/or distance between the LIDAR system and one or more objects located outside of the LIDAR system) is generated.

The reference waveguide 24 carries the first reference signal to a splitter 42. The splitter 42 moves a portion of the outgoing LIDAR signal from the reference waveguide 24 onto a second reference waveguide 44 as a second reference signal. The second reference waveguide 44 carries the second reference signal to the second processing unit 40 for further processing.

As will be described in more detail below, the first processing unit 21 and the second processing unit 40 each combines a comparative signal with a reference signal to form a composite signal that carries LIDAR data for a sample region on the field of view. Accordingly, the composite signal can be processed so as to extract LIDAR data (one or more data selected from the group consisting of one or more reflecting object material indicators, radial velocity between the LIDAR system and an object external to the LIDAR system, and distance between the LIDAR system and the object) for the sample region.

In some instances, a LIDAR chip constructed according to FIG. 1 or FIG. 2 is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on light from the system return signal and light from the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view. Additionally or alternately, the LIDAR adapter can be configured to operate on light from the system return signal and light from the LIDAR output signal such that the second LIDAR input signal and the LIDAR output signal travel on different optical pathways between the LIDAR adapter and the LIDAR chip but on the same optical pathway between the LIDAR adapter and a reflecting object in the field of view.

Figure 3:
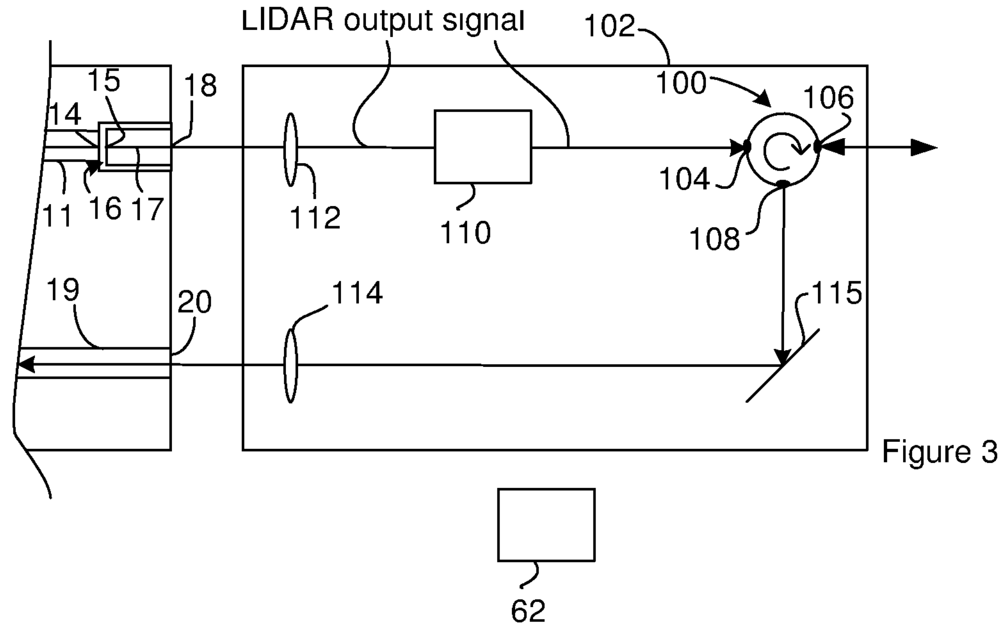
FIG. 3 is a topview of an example of a LIDAR adapter that is suitable for use with the LIDAR chip of FIG. 1.

An example of a LIDAR adapter that is suitable for use with the LIDAR chip of FIG. 1 is illustrated in FIG. 3. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 11 of the LIDAR chip and exits from the second port 106 as an assembly output signal.

The assembly output signal includes, consists of, or consists essentially of light from the LIDAR output signal received from the LIDAR chip. Accordingly, the assembly output signal may be the same or substantially the same as the LIDAR output signal received from the LIDAR chip. However, there may be differences between the assembly output signal and the LIDAR output signal received from the LIDAR chip. For instance, the LIDAR output signal can experience optical loss as it travels through the LIDAR adapter and/or the LIDAR adapter can optionally include an amplifier 110 configured to amplify the LIDAR output signal as it travels through the LIDAR adapter.

When one or more objects in the sample region reflect light from the assembly output signal, at least a portion of the reflected light travels back to the circulator 100 as an assembly return signal. At least a portion of the light from the assembly return signal enters the circulator 100 through the second port 106. FIG. 3 illustrates the LIDAR output signal and the assembly return signal traveling between the LIDAR adapter and the sample region along the same optical path.

The assembly return signal exits the circulator 100 through the third port 108 and is directed to the comparative waveguide 19 on the LIDAR chip. Accordingly, light from the assembly returned signal can serve as the first LIDAR input signal and the first LIDAR input signal includes or consists of light from the assembly return signal. Accordingly, the LIDAR output signal and the first LIDAR input signal travel between the LIDAR adapter and the LIDAR chip along different optical paths.

As is evident from FIG. 3, the LIDAR adapter can optionally include optical components in addition to the circulator 100. For instance, the LIDAR adapter can include components for directing and controlling the optical path of the LIDAR output signal and the LIDAR return signal. As an example, the adapter of FIG. 3 includes an optional amplifier 110 positioned so as to receive and amplify the LIDAR output signal before the LIDAR output signal enters the circulator 100. The amplifier 110 and/or the amplifier 16 can be operated by electronics 62 allowing the electronics 62 to control the power of the LIDAR output signal.

The optical components can include one or more beam-shaping components. For instance, FIG. 3 illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal on the facet 20 of the comparative waveguide 19.

The LIDAR adapter can also include one or more direction changing components such as mirrors or prisms. FIG. 3 illustrates the LIDAR adapter including a mirror 115 as a direction-changing component 115 that redirects the LIDAR return signal from the circulator 100 to the facet 20 of the comparative waveguide 19.

Figure 4:
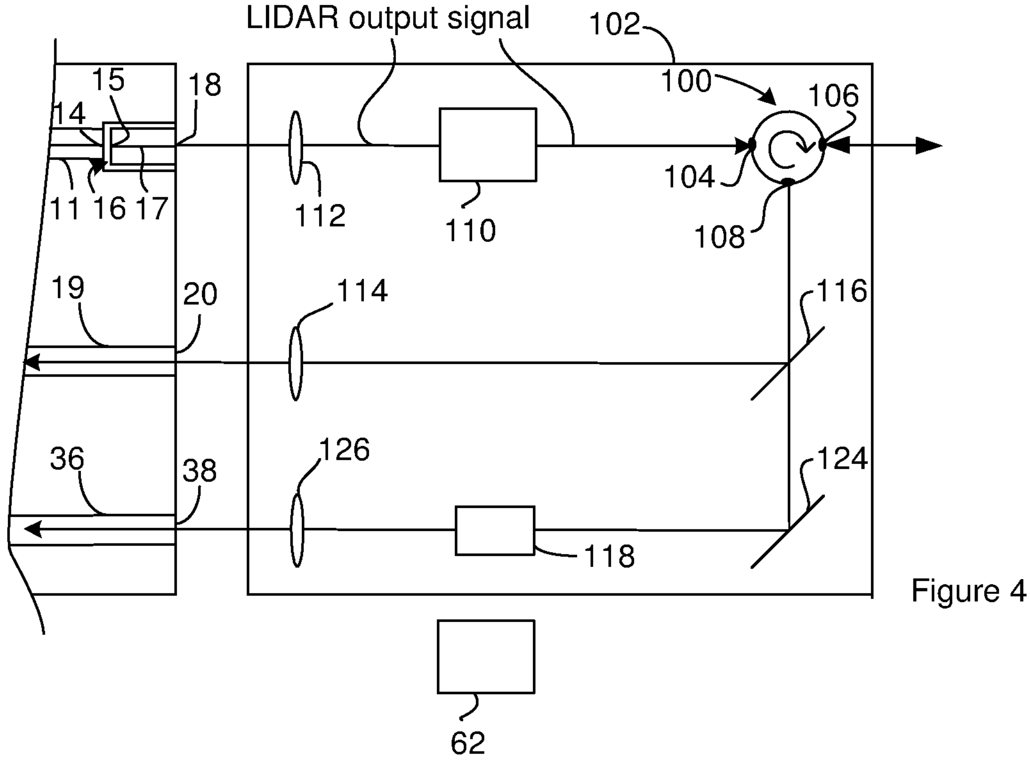
FIG. 4 is a topview of an example of a LIDAR adapter that is suitable for use with the LIDAR chip of FIG. 2.

FIG. 4 illustrates the LIDAR system of FIG. 3 modified such that the LIDAR adapter is suitable for use with the LIDAR chip of FIG. 2. Light from the light system 10 is typically linearly polarized. Accordingly, the typical system output signal carries light of a primary or exclusive polarization state. Reflection of a system output signal can change the polarization state of all or a portion of the system output signal. In some instances, the LIDAR system of FIG. 4 is operated to compensate for the change in polarization state caused by this reflection.

The LIDAR adapter of FIG. 4 includes a polarization splitter 116 that receives the assembly return signal from the circulator 100. The polarization splitter 116 splits the assembly return signal into a first return signal and a second return signal. The first return signal is directed to the comparative waveguide 19 on the LIDAR chip and serves as the first LIDAR input signal described in the context of FIG. 1. The second return signal is directed to a polarization rotator 118. The polarization rotator 118 outputs a second LIDAR input signal that is directed to the second comparative waveguide 36 on the LIDAR chip and serves as the second LIDAR input signal.

One example of a polarization splitter 116 is constructed such that the first return signal has a first polarization state but does not have or does not substantially have a second polarization state and the second return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the light system can be linearly polarized such that the LIDAR output signal has the first polarization state. Suitable polarization splitters 116 include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 118 shown in FIG. 4 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR input signal carry light of the same polarization state, the comparative signals that result from the first LIDAR input signal have the same polarization state as the comparative signals that result from the second LIDAR input signal. As a result, the polarization rotator 118 is arranged such that the comparative signals that result from the first LIDAR input signal and the first reference signals have the same polarization state and the comparative signals that result from the second LIDAR input signal and the second reference signals have the same polarization state. This result can be achieved with other arrangements of the components in the LIDAR system. For instance, the polarization rotator 118 can be positioned to rotate the polarization state of the second reference signal rather than the polarization state of the second portion of the system return signal.

Suitable polarization rotators 118 include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 4, the first comparative signals, the second comparative signals, the first reference signals, and the second reference signals can each have light of the first polarization state.

The LIDAR adapter of FIG. 4 can include additional optical components including passive optical components. For instance, the LIDAR adapter can include a beam-shaping component(s) such as an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 38 of the second comparative waveguide 36. The LIDAR adapter also includes one or more direction changing components 124 such as mirrors and prisms. FIG. 4 illustrates the LIDAR adapter including a mirror 124 as a direction-changing component that redirects the second return signal from the circulator 100 to the facet 38 of the second comparative waveguide 36 and/or to the third lens 126.

The LIDAR chips include one or more waveguides that constrains the optical path of one or more light signals. While the LIDAR adapter can include waveguides, the optical path that the signals travel between components on the LIDAR adapter and/or between the LIDAR chip and a component on the LIDAR adapter can be free space. For instance, the signals can travel through the atmosphere in which the LIDAR chip, the LIDAR adapter, and/or the base

102 is positioned when traveling between the different components on the LIDAR adapter and/or between a component on the LIDAR adapter and the LIDAR chip. As a result, the components on the LIDAR adapter can be discrete optical components that are attached to the base 102. In some instances, the LIDAR adapter excludes waveguides. Additionally or alternately, the optical components on the LIDAR adapter can be arranged such that light signals traveling between at least one pair of the components on the LIDAR adapter travel through a free space region for a distance of at least 0.1 mm, 1 mm, 5 mm, or 10 mm where the free space region does not confine the light signals in any direction. Additionally or alternately, the optical components on the LIDAR chip can be arranged such that light signals traveling between optical components on the LIDAR chip do not travel through free space or such that light signals traveling between the components on the LIDAR chip do not travel through a free space region for a distance greater than 1 micron, 1 mm, or 5 mm where the free space region does not confine the light signals in any direction.

Suitable bases 102 for the LIDAR adapter include, but are not limited to, substrates, platforms, and plates. Suitable substrates include, but are not limited to, glass, silicon, and ceramics. In some instances, the base consists of a single layer of material. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

Figure 5:
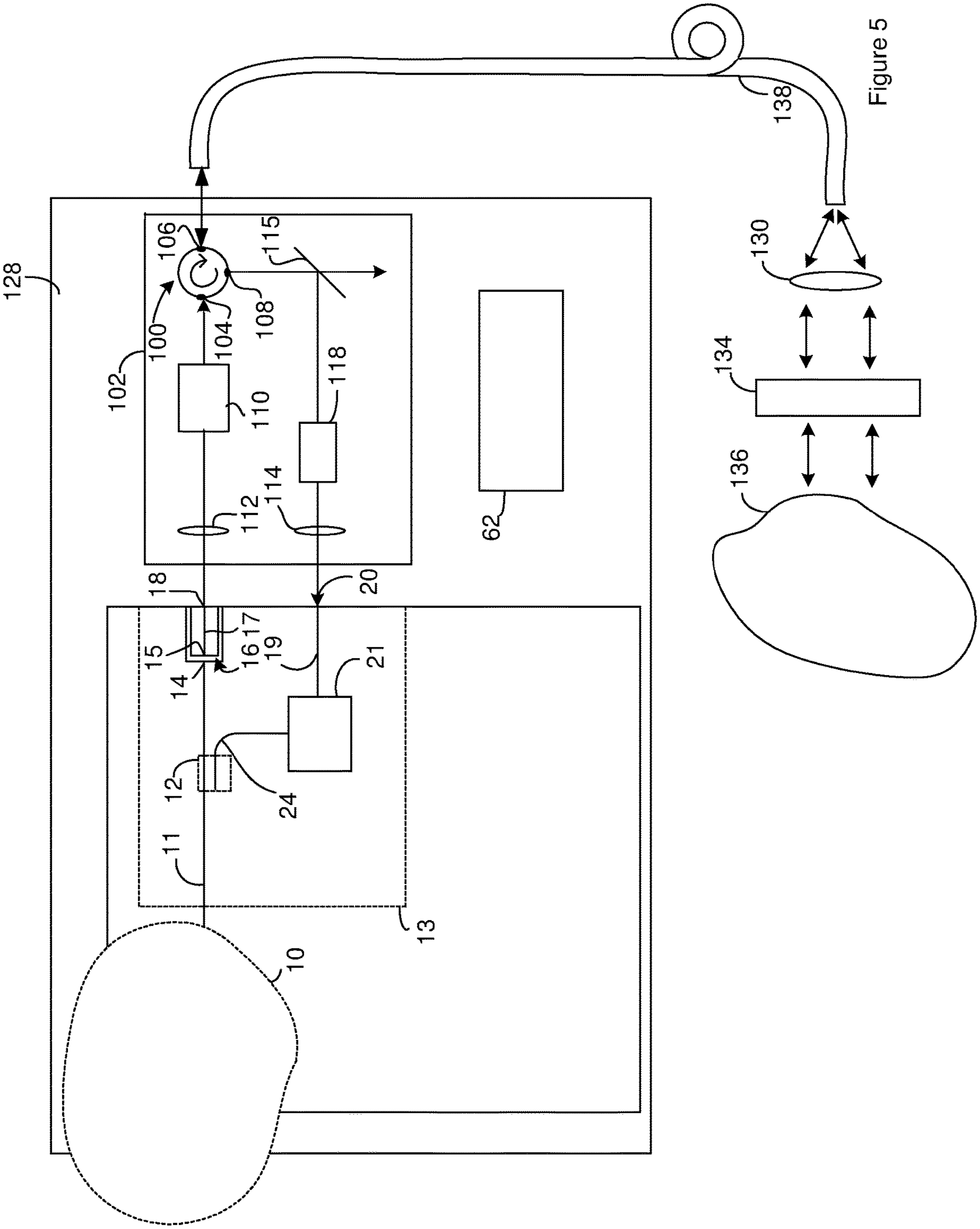
FIG. 5 is a topview of a LIDAR system that includes the LIDAR chip of FIG. 1 and the LIDAR adapter of FIG. 3 on a common mount.

When the LIDAR system includes a LIDAR chip and a LIDAR adapter, the LIDAR chip, electronics, and the LIDAR adapter can be included in a LIDAR assembly where the LIDAR chip, the LIDAR adapter, and all or a portion of the electronics are positioned on a common mount 128. Suitable common mounts 128 include, but are not limited to, glass plates, metal plates, silicon plates and ceramic plates. As an example, FIG. 5 is a topview of a LIDAR system that includes the LIDAR chip and electronics 62 of FIG. 1 and the LIDAR adapter of FIG. 3 on a common mount 128. As another example, FIG. 6 is a topview of a LIDAR system that includes the LIDAR chip and electronics 62 of FIG. 2 and the LIDAR adapter of FIG. 4 on a common mount 128.

Figure 6:
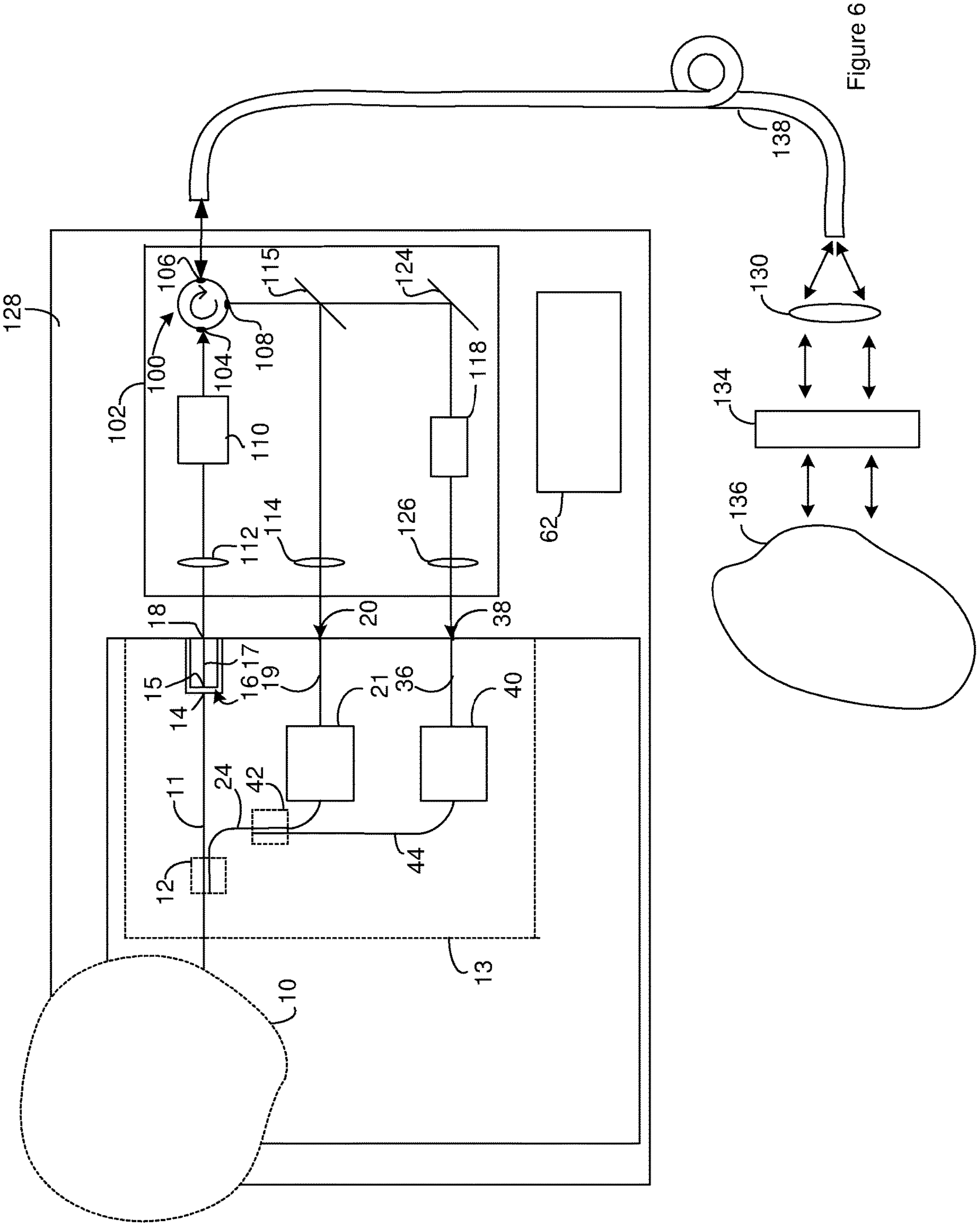
FIG. 6 is a topview of a LIDAR system that includes the LIDAR chip of FIG. 2 and the LIDAR adapter of FIG. 4 on a common mount.

Although FIG. 5 and FIG. 6 illustrate the electronics 62 as located on the common mount 128, all or a portion of the electronics can be located off the common mount 128. When the light system 10 is located off the LIDAR chip, the light system can be located on the common mount 128 or off of the common mount 128. Suitable approaches for mounting the LIDAR chip, electronics, and/or the LIDAR adapter on the common mount 128 include, but are not limited to, epoxy, solder, and mechanical clamping.

The LIDAR systems of FIG. 5 and FIG. 6 can include one or more system components that are at least partially located off the common mount 128. Examples of suitable system components include, but are not limited to, optical links, beam-shaping components, polarization state rotators, beam steering components, optical splitters, optical amplifiers, and optical attenuators. For instance, the LIDAR systems of FIG. 5 and FIG. 6 can include one or more beam-shaping components 130 that receive the assembly output signal from the adapter and output a shaped signal. The one or more beam-shaping components 130 can be configured to provide the shaped signal with the desired shape. For instance, the one or more beam-shaping components 130 can be configured to output a shaped signal that focused, diverging or collimated. In FIG. 5 and FIG. 6, the one or more beam-shaping components 130 is a lens that is configured to output a collimated shaped signal.

The LIDAR systems of FIG. 5 and FIG. 6 can optionally include one or more beam steering components 134 that receive the shaped signal from the one or more beam-shaping components 130 and that output the system output signal. For instance, FIG. 5 and FIG. 6 illustrate a beam steering component 134 that receive the shaped signal from a beam-shaping component 130. The electronics can operate the one or more beam steering components 134 so as to steer the system output signal to different sample regions 135. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Suitable beam steering components include, but are not limited to, movable mirrors, MEMS mirrors, optical phased arrays (OPAs), optical gratings, actuated optical gratings and actuators that move the LIDAR chip, LIDAR adapter, and/or common mount 128.

When the system output signal is reflected by an object 136 located outside of the LIDAR system and the LIDAR, at least a portion of the reflected light returns to the LIDAR system as a system return signal. When the LIDAR system includes one or more beam steering components 134, the one or more beam steering components 134 can receive at least a portion of the system return signal from the object 136. The one or more beam-shaping components 130 can receive at least a portion of the system return signal from the object 136 or from the one or more beam steering components 134 and can output the assembly return signal that is received by the adapter.

The LIDAR systems of FIG. 5 and FIG. 6 include an optional optical link 138 that carries optical signals to the one or more system components from the adapter, from the LIDAR chip, and/or from one or more components on the common mount. For instance, the LIDAR systems of FIG. 5 and FIG. 6 include an optical fiber configured to carry the assembly output signal to the beam-shaping components 130. The use of the optical link 138 allows the source of the system output signal to be located remote from the LIDAR chip. Although the illustrated optical link 138 is an optical fiber, other optical links 138 can be used. Other suitable optical links 138 include, but are not limited to, free space optical links and waveguides. When the LIDAR system excludes an optical link, the one or more beam-shaping components 130 can receive the assembly output signal directly from the adapter.

Figure 7A:
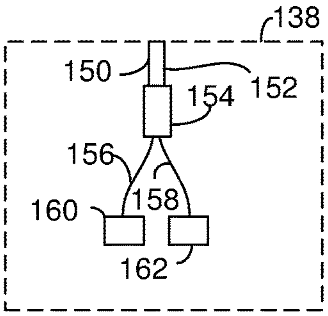
FIG. 7A is a schematic of an example of a suitable processing unit for use in a LIDAR system.
Figure 7B:
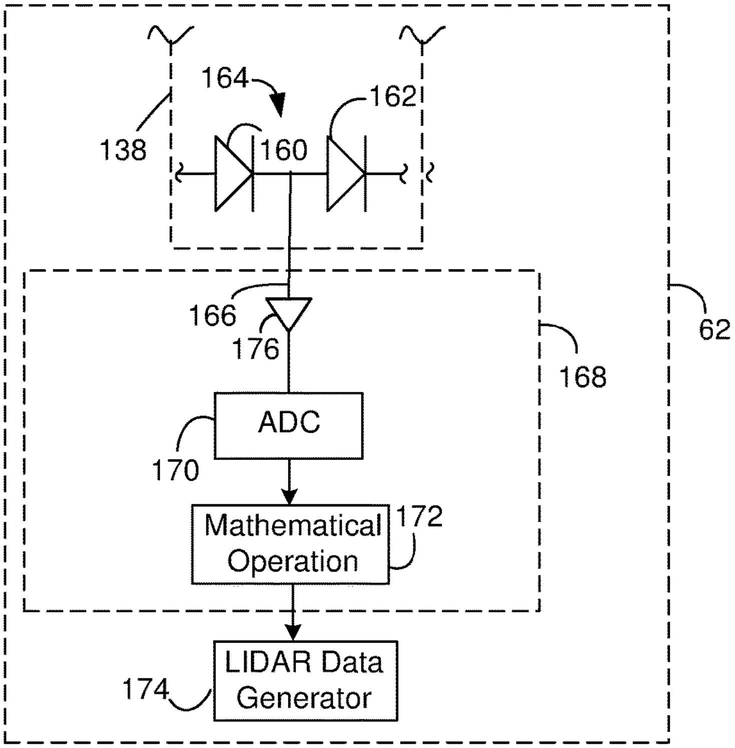
FIG. 7B is a schematic of the relationship between the electronics and the light sensors in a processing unit.

FIG. 7A through FIG. 7B illustrate an example of a processing unit 138 that is suitable for use as the processing unit 21 and/or the processing unit 40 in the above LIDAR systems. The processing unit 138 receives a comparative signal contribution from a comparative waveguide 150 and a reference signal contribution from a reference waveguide 152. The comparative waveguide 150 in FIG. 7A can represent the comparative waveguide 19 of FIG. 1 while the reference waveguide 152 in FIG. 7A is the reference waveguide 24 of FIG. 1. Alternately, the comparative waveguide 150 in FIG. 7A can represent the comparative waveguide 19 of FIG. 2 while the reference waveguide 152 in FIG. 7A is the reference waveguide 24 of FIG. 2. Accordingly, the processing units 138 can receive the first comparative signal as the comparative signal contribution and the first reference signal as the reference signal contribution. Alternately, the comparative waveguide 150 in FIG. 7A can represent the second comparative waveguide 36 of FIG. 2 while the reference waveguide 152 in FIG. 7A represents the second reference waveguide 44 of FIG. 2. Accordingly, the processing units 138 can receive the second comparative signal as the comparative signal contribution and the second reference signal as the reference signal contribution.

The comparative waveguide 150 carries the comparative signal contribution to a light-combining component 154. The reference waveguide 152 carries the reference signal contribution to the light-combining component 154. The light-combining component 154 combines the comparative signal contribution and the reference signal contribution into a composite signal. The comparative signals that result from the first LIDAR input signal and the first reference signals have the same polarization state. Additionally, when a LIDAR assembly processes a second LIDAR input signal such as shown in FIG. 6, the comparative signals that result from the second LIDAR input signal and the second reference signals have the same polarization state. As a result, the comparative signal contribution and the reference signal contribution combined by the light-combining component 154 have the same polarization state. Due to the difference in frequencies between the comparative signal contribution and the reference signal contribution, the composite signal is beating between the comparative signal contribution and the reference signal contribution. For instance, the composite signal can result from combining a first reference signal and a first comparative signal of the first polarization state and exclude or substantially exclude light of the second polarization state or the composite signal results from combining a first reference signal and a first comparative signal of the second polarization state and excludes or substantially excludes light of the first polarization state.

The light-combining component 154 also splits the resulting composite signal onto a first detector waveguide 156 and a second detector waveguide 158. The first auxiliary detector waveguide 156 carries a first portion of the composite signal to a first light sensor 160 that converts the first portion of the composite signal to a first electrical signal. The second detector waveguide 158 carries a second portion of the composite signal to a second light sensor 162 that converts the second portion of the composite signal to a second electrical signal. Examples of suitable light sensors include germanium photodiodes (PDs), and avalanche photodiodes (APDs).

In some instances, the light-combining component 154 splits the composite signal such that the comparative signal contribution in the included in the first portion of the composite signal is phase shifted by 180° relative to comparative signal contribution in the second portion of the composite signal but the reference signal contribution in the second portion of the composite signal is in-phase with the reference signal contribution in the first portion of the composite signal. Alternately, the light-combining component 154 splits the composite signal such that the reference signal contribution in the first portion of the composite signal is phase shifted by 180° relative to the reference signal contribution in the second portion of the composite signal but the comparative signal contribution in the first portion of the composite signal is in-phase with the portion of the comparative signal in the second portion of the composite signal. Examples of suitable light sensors include germanium photodiodes (PDs), and avalanche photodiodes (APDs).

FIG. 7B provides a schematic of the relationship between the electronics and the light sensors in a processing unit 138. The symbol for a photodiode is used to represent the first light sensor 160 and the second light sensor 162, but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The electronics 62 can connect the first light sensors 160 and the second light sensor 162 as a balanced detector 164. For instance, the electronics can connect the first light sensors 160 in series with the second light sensor 162 as illustrated in FIG. 7B. The serial connection between the first light sensor 160 and the second light sensors 162 carries the output from the balanced detector as a data signal. The data signal can be carried on a sensor output line 166 and can serve as an electrical representation of the composite signals.

The electronics 62 include a transform mechanism 168 configured to perform a mathematical transform on the data signal. The transform mechanism 168 includes an Analog-to-Digital Converter (ADC) 170 that receives the data signal from the sensor output line 166. The Analog-to-Digital Converter (ADC) 170 converts the data signal from an analog form to a digital form and outputs a digital data signal. The digital data signal is a digital representation of the data signal.

The transform mechanism 168 includes a mathematical operation component 172 configured to receive the digital data signal. The mathematical operation component 172 is configured to perform a mathematical operation on the received digital data signal. Examples of suitable mathematical operations include, but are not limited to, mathematical transforms such as Fourier transforms. In one example, the mathematical operation component 172 performs a Fourier transform on the digital signal so as to convert from the time domain to the frequency domain. The mathematical transform can be a real transform such as a real Fast Fourier Transform (FFT). A real Fast Fourier Transform (FFT) can provide an output that indicates magnitude as a function of frequency. As a result, a peak in the output of the Fast Fourier Transform can occur at and/or indicate the correct solution for the beat frequency of the beating signals. The mathematical operation component 172 can execute the attributed functions using firmware, hardware or software or a combination thereof.

The electronics include a LIDAR data generator 174 that receives the output from the transform component 168. The LIDAR data generator 174 can perform a peak find on the output of the transform component 168 to identify the peak in the frequency of the output of the transform component 168. The LIDAR data generator 174 treats the frequency at the identified peak as the beat frequency of the beating signals that each results from all or a portion of a comparative signal beating against all or a portion of a reference signal. The LIDAR data generator 174 can use the identified beat frequencies in combination with the frequency pattern of the LIDAR output signal and/or the system output signal to generate the LIDAR data.

As shown in FIG. 7B, the sensor output line 166 that carries the data signals can optionally include an amplifier 176. Suitable amplifiers 176 include, but are not limited to, transimpedance amplifiers (TIAs).

Figure 7C:
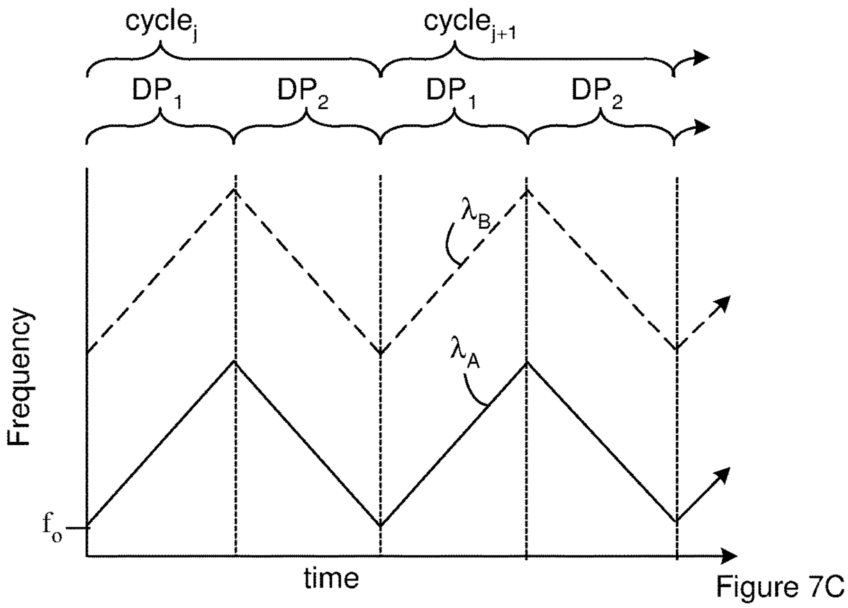
FIG. 7C shows an example of a suitable frequency pattern for the system output signal.

FIG. 7C has a solid line that is labeled $\lambda_A$ and shows an example of a suitable frequency pattern for the LIDAR output signal and accordingly the system output signal. Accordingly, the solid line also represents the frequency pattern for the reference signal. FIG. 7C shows the frequency versus time pattern over a sequence of two cycles labeled $cycle_j$ and $cycle_{j+1}$. In some instances, the frequency versus time pattern is repeated in each cycle as shown in FIG. 7C. The illustrated cycles do not include re-location periods and/or re-location periods are not located between cycles. As a result, FIG. 7C illustrates the results for a continuous scan of the system output signal to multiple different sample regions in a field of view.

Each cycle includes K data periods that are each associated with a period index k and are labeled $DP_k$. In the example of FIG. 7C, each cycle includes two data periods (with k=1 and 2). In some instances, the frequency versus time pattern is the same for the data periods that correspond to each other in different cycles as is shown in FIG. 7C. Corresponding data periods are data periods with the same period index. As a result, each data period $DP_1$ can be considered corresponding data periods for that same channel index (i) and the associated frequency versus time patterns are the same in FIG. 7C. At the end of a cycle, the electronics return the frequency to the same frequency level at which it started the previous cycle.

During each data period, the frequency of the system output signal is varied at a constant rate. The rate can be zero but at least a portion of the data periods in each cycle have the system output signal varied at a non-zero rate. The direction and/or rate of the frequency change changes at the change of data periods from the same cycle. For instance, during the data period $DP_1$ and the data period $DP_2$, the electronics operate the light system such that the frequency of the system output signal changes at a linear rate a. The direction of the frequency change during the data period $DP_1$ is the opposite of the direction of the frequency change during the data period $DP_2$.

The beat frequencies ($f_{LDP}$) from two or more different data periods in the same cycle can be combined to generate the LIDAR data. For instance, the beat frequency determined from $DP_1$ in FIG. 7C can be combined with the beat frequency determined from $DP_2$ in FIG. 7C to determine the LIDAR data for a sample region. As an example, the following equation applies during a data period where electronics increase the frequency of the outgoing LIDAR signal during the data period such as occurs in data period $DP_1$ of FIG. 7C: $f_{ub}=-f_d+\alpha\tau$ where $f_{ub}$ is the beat frequency determined from the output of the mathematical operation component 172, $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 7C: $f_{db}=-f_d-\alpha\tau$ where $f_{db}$ is the beat frequency determined from the output of the mathematical operation component 172. In these two equations, $f_d$ and $\tau$ are unknowns. The electronics solve these two equations for the two unknowns. The radial velocity for the sample region then be determined from the Doppler shift ($v=c*f_d/(2f_c)$) and/or the separation distance for that sample region can be determined from $c*f_d/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

The frequency versus time pattern illustrated in FIG. 7C also includes a dashed line labeled $\lambda_B$. A light system 10 can be configured to output multiple different light system signals that can each carry a different channel that is each at a different wavelength ($\lambda_A$, $\lambda_B$, $\lambda_C$, . . . ). As illustrated by the dashed line labeled $\lambda_B$, the electronics can operate the light system 10 to provide each of the light system signals with a frequency versus time pattern according to FIG. 7C.

The LIDAR system in FIG. 6 includes a second processing unit 40 that can receive a portion of the LIDAR signal. For instance, reflection of the system output signal by an object may change the angle of polarization of all a portion of the system return signal. Accordingly, the LIDAR signal can carry light of different polarization states away from the reflecting object. For instance, a first portion of the LIDAR signal and a second portion of the LIDAR signal can include light in different polarization states. As a result, the polarization splitter 116 can divide the LIDAR signal into the first portion of the LIDAR signal and the second first portion of the LIDAR signal. The first portion of the LIDAR signal is directed to the first processing unit 21 and the second portion of the LIDAR signal is directed to the second processing unit 40.

The portion of the LIDAR signal received by the first processing unit 21 can serve as the first comparative signal and the portion of the LIDAR signal received by the second processing unit 40 can serve as the second comparative signal. The electronics 62 can use the output from the second processing unit 40 to generate LIDAR data. As a result, the electronics can generate a first LIDAR data results from the output of the first processing unit 21 and second LIDAR data results from the output of the second processing unit 40. As a result, the FIG. 6 LIDAR system configuration can result in the LIDAR data for a single sample region in the field of view being generated from multiple different composite signals (i.e. a first composite signal from the first processing unit 21 and a second composite signal the second processing unit 40) from the sample region.

In some instances, determining the LIDAR data for the sample region includes the electronics combining the LIDAR data results from different composite signals (i.e. the composite signal and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Figure 8A:
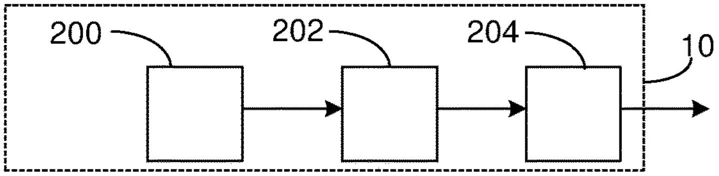
FIG. 8A through FIG. 8C illustrate examples of light systems that serve as a source of light for signals output from the LIDAR system.
Figure 8B:
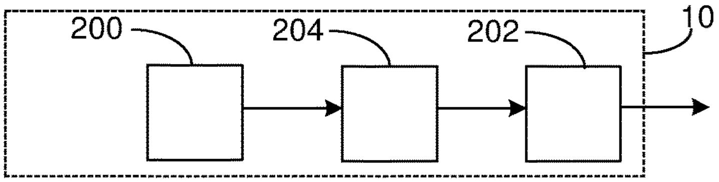
Figure 8C:
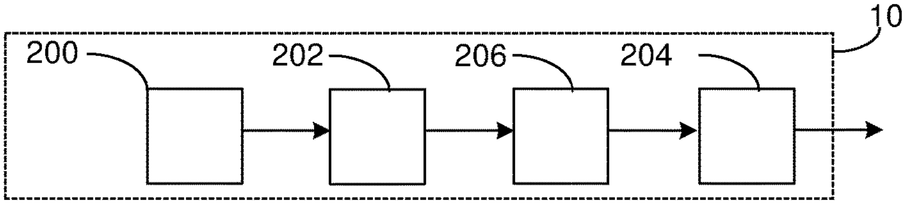

FIG. 8A through FIG. 8C illustrate multiple different light system constructions that are suitable for use with the above LIDAR systems. The light system 10 can include a light source 200 and a first optical isolator 202. The light system can also include a control component 204 for controlling operation of the light source 200. For instance, the electronics can use output from the control component 204 in a feedback control loop to control a process variable of a source signal output from the light source 200. Examples of the suitable process variables include the frequency of the controlled light signal and/or the phase of the controlled light signal.

As illustrated in FIG. 8A, the first optical isolator 202 can be positioned on an optical pathway between the light source 200 and the control component 204. As a result, the first optical isolator 202 is configured to receive and pass light from the source signal output by the light source 200. Electronics can operate the control component 204 such that the light that the control component 204 received from the first optical isolator 202 is used to control the light source 200 and can output a preliminary light system signal. The preliminary light system signal can serve as the light system signal on the utility waveguide 11.

The components of the light system 10 can have other configurations. For instance, the control component 204 can be positioned on an optical pathway between light source 200 and the first optical isolator 202 as shown in FIG. 8B. In this example, the control component 204 can receive light from the source signal and can output a second source signal. The first optical isolator 202 can receive the second source signal from the control component 204 and can output a preliminary light system signal. The preliminary light system signal can serve as the light system signal on the utility waveguide 11.

The first optical isolator 202 can be one of multiple optical isolators. For instance, FIG. 8C illustrates the first optical isolator 202 and a second optical isolator 206 positioned on an optical pathway between the light source 200 and the control component 204. The first optical isolator 202 is configured to receive and pass light from the source signal. The second optical isolator 206 is configured to receive and transmit light from the first optical isolator 202.

Although not shown in FIG. 8A through FIG. 8C, the light system can include components in addition to the light source, the one or more isolators and the control component 104. For instance, the light system can include beam steering components such as one or more mirrors, gratings, solid state scanners, and/or can include beam shaping components such as one or more lenses.

In some instances, a LIDAR chip constructed according to FIG. 1 or FIG. 2 is used in conjunction with an isolator adapter. In some instances, the isolator adapter can be physically optically along an optical pathway that extends from the LIDAR chip, through the isolator adapter and returns to the LIDAR chip. Additionally, the isolator adapter can be configured to operate on light from the source signal such that light is only transmitted in one direction along the optical pathway. For instance, the isolator adapter can be configured such that light from the source signal only travels from the light source toward one or more isolators but does travel from the one or more isolators toward the light source.

Figure 9A:
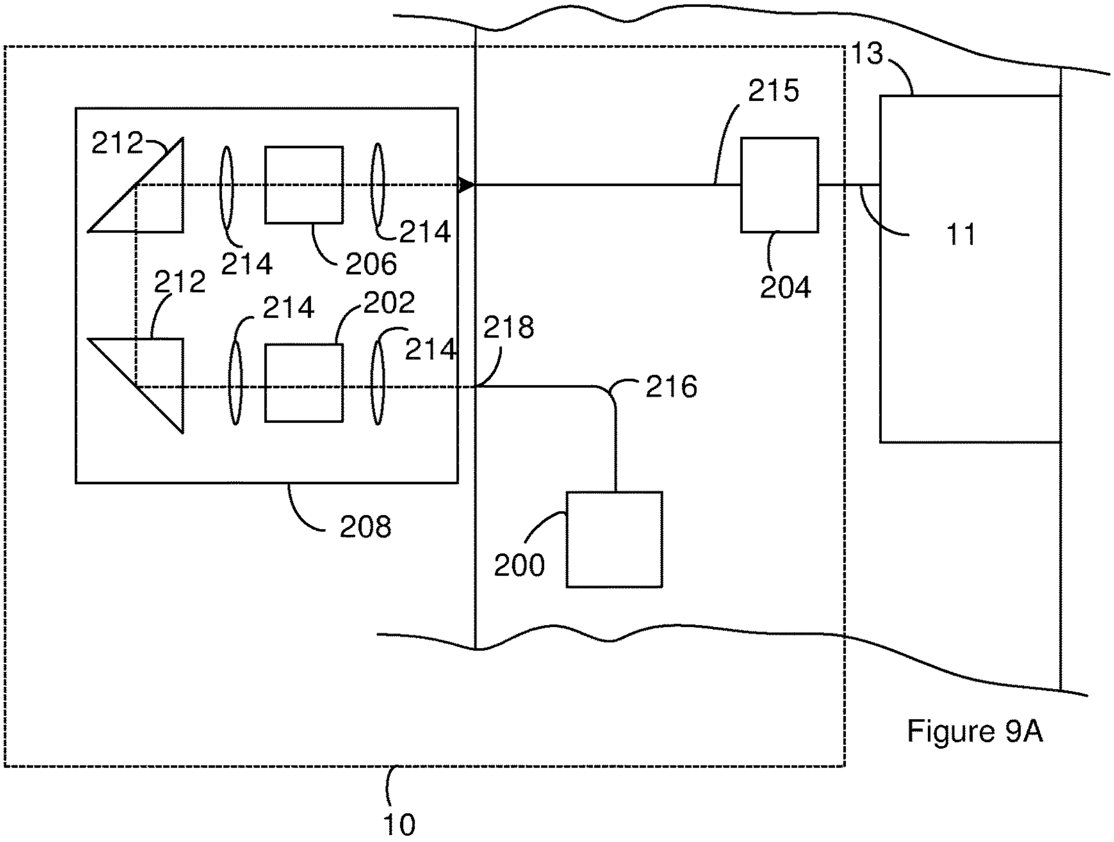
FIG. 9A is a topview of a portion of a LIDAR system that includes a LIDAR chip used in conjunction with an isolator adapter.

FIG. 9A illustrates a portion of a LIDAR system that includes a LIDAR chip used in conjunction with an isolator adapter. The LIDAR system includes a light system constructed according to FIG. 8C. The light system includes a light source 200 and control component 204 that are included on the LIDAR chip and/or integrated with the LIDAR chip. The isolator adapter includes one or more components positioned on a base. For instance, the light system includes at least one optical isolator located on the base instead of on the LIDAR chip. For instance, the isolator adapter of FIG. 9A includes the first optical isolator 202 and the second optical isolator 206 positioned on a base 208.

The light system in the LIDAR system of FIG. 9A includes optical components in addition to the light source 200, the one or more isolators and the control component 104. For instance, the light system includes one or more mirrors 212 that are positioned on the base 208 of the isolator adapter and that serve as beam steering components. The light system 10 also includes one or more lenses 214 that are positioned on the base of the isolator adapter and that serve as beam shaping components. The lenses are each configured to provide collimation of the light signal received by the lens.

During operation of the LIDAR system, the light source 200 outputs the source signal. The source signal is received at a source waveguide 216. The source waveguide carries the source signal to a port 218 through which the source signal can exit from the LIDAR chip. For instance, the source waveguide can terminate at a facet that serves as the port 218 and the source signal can exit from the LIDAR chip through the facet. The portion of the source signal that exits from the LIDAR chip is received by the one or more components of the isolator adapter. For instance, the light from source signal passes through one of the lenses 214 and is received at the first optical isolator 202 where it can serve as an adapter signal. The first optical isolator 202 passes the adapter signal and can output the passed adapter signal as an isolator output signal. The isolator output signal output from the first optical isolator 202 passes through one of the lenses 214 and is received by a mirror 212 that directs the isolator output signal toward another one of the mirrors 212 that directs the light from the isolator output signal toward the second optical isolator 206. Light from the isolator output signal is received at the second optical isolator 206 where it can serve as a second adapter signal. The second optical isolator 206 passes the second adapter signal and can output the passed second adapter signal as a second isolator output signal. Light from the second isolator output signal passes through one of the lenses 214 and exits the isolator adapter as an adapter output signal.

The LIDAR chip can receive the adapter output signal. For instance, the LIDAR chip can receive the portion of the second isolator output signal that exits from the isolator adapter. As an example, the LIDAR chip can include a LIDAR chip waveguide 215 that receives at least a portion of the second isolator output signal from the isolator adapter. The LIDAR chip waveguide 215 can carry the light from the second isolator output signal to the control component 204. The control component 204 operates on the second isolator output signal received from the isolator adapter and can output a preliminary light system signal on the utility waveguide 11. The preliminary light system signal can serve as the light system signal. Electronics can operate the control component 204 such that the light that the control component 204 receives from the second isolator output signal, and accordingly from the source signal, is used to control the light source 200 and/or optical properties of the system output signal.

The first optical isolator 202 and the second optical isolator 206 are configured transmit light in one direction while stopping or substantially stopping the transmission of light traveling in the reverse direction. For instance, one or more components on the LIDAR chip and/or the adapter may cause light to be reflected back toward the light source 100. The amplifier, such as the amplifier 16 disclosed in at least the context of FIG. 1 and FIG. 2 and/or the amplifier 110 disclosed in at least the context of FIG. 3 and FIG. 4, can be a large source of this back reflection. The amount of back reflection from these amplifiers can be sufficient to affect the performance of the LIDAR system. The one or more optical isolators can be configured to stop or substantially stop the back-reflected light from reaching the light source and can accordingly allow the LIDAR system to have the benefits of amplification without loss in performance of the LIDAR system.

As noted above, the LIDAR chip includes one or more waveguides that constrains the optical path of one or more light signals. While the isolator adapter can include waveguides, the optical path that the signals travel between components on the isolator adapter and/or between the LIDAR chip and a component on the isolator adapter can be free space. For instance, the signals can travel through the atmosphere in which the LIDAR chip, the LIDAR adapter, and/or the isolator adapter is positioned when traveling between the different components on the isolator adapter. As a result, the components on the isolator adapter can be discrete optical components that are attached to the base 208.

In some instances, the isolator adapter excludes waveguides. Additionally or alternately, the optical components on the isolator adapter can be arranged such that light signals traveling between at least one pair of the components on the isolator adapter travel through a free space region for a distance of at least 0.1 mm, 5 mm, or 10 mm where the free space region does not confine the light signals in any direction. Additionally or alternately, the optical components on the LIDAR chip can be arranged such that light signals traveling between optical components on the LIDAR chip do not travel through free space or such that light signals traveling between the components on the LIDAR chip do not travel through a free space region for a distance greater than 1 mm, 10 mm, or 50 mm where the free space region does not confine the light signals in any direction.

Suitable bases 108 for the isolator adapter include, but are not limited to, substrates, platforms, and plates. Suitable substrates include, but are not limited to, glass, silicon, and ceramics. In some instances, the base consists of a single layer of material. The components can be discrete components that are attached to the substrate. Suitable techniques for attaching discrete components to the base 208 include, but are not limited to, epoxy, solder, and mechanical clamping. In one example, one or more of the components on the base 208 are integrated components and the remaining components are discrete components.

The LIDAR system of FIG. 9A includes a light system constructed according to FIG. 8C; however, the light system can be converted to the light system of FIG. 8A by removal of the first optical isolator 202 or the second optical isolator 206.

Figure 9B:
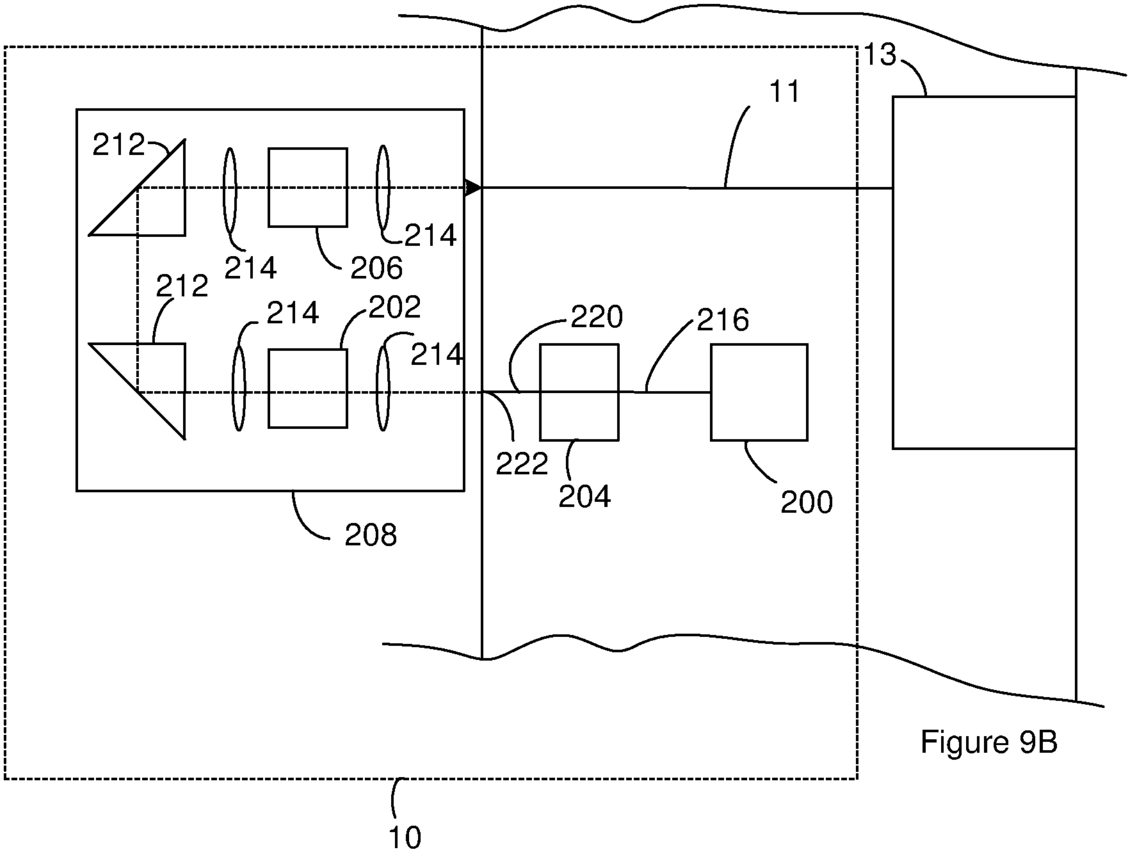
FIG. 9B is a topview of a portion of a LIDAR system that includes a LIDAR chip used in conjunction with an isolator adapter.

FIG. 9B illustrates the LIDAR system of FIG. 9A modified to include a light system constructed according to FIG. 8B but with a first optical isolator 202 and a second optical isolator 206. During operation of the LIDAR system of FIG. 9B, the source waveguide carries the source signal from the light source 200 to the control component 204. The control component 204 operates on the source signal received from the light source 200 and output a second source signal on a second source waveguide 220. The second source waveguide 220 carries the second source signal to a second port 222 through which the source signal can exit from the LIDAR chip. For instance, the second source waveguide 220 can terminate at a facet that serves as the second port 222 and the second source signal can exit from the LIDAR chip through the facet of the second source waveguide 220. Electronics can operate the control component 204 such that the light that the control component 204 receives from the second source signal, and accordingly from the source signal, is used to control the light source 200 and/or optical properties of the system output signal.

The portion of the second source signal that exits from the LIDAR chip is received by the one or more components of the isolator adapter. For instance, the second source signal passes through one of the lenses 14 and is received at the first optical isolator 202 where it can serve as an adapter signal. The first optical isolator 202 passes the adapter signal and can output the passed portion of the adapter signal as an isolator output signal. The isolator output signal output from the first optical isolator 202 passes through one of the lenses 214 and is received by a mirror 212 that directs the isolator output signal toward another one of the mirrors 212 that directs the light from the isolator output signal toward the second optical isolator 206. Light from the isolator output signal is received at the second optical isolator 206 where it can serve as a second adapter signal. The second optical isolator 206 passes the second adapter signal and can output the passed second adapter signal as a second isolator output signal. Light from the second isolator output signal passes through one of the lenses 214 and exits the isolator adapter as an adapter output signal.

The LIDAR chip can receive the adapter output signal. For instance, the LIDAR chip can receive the portion of the second isolator output signal that exits from the isolator adapter. As an example, the utility waveguide 11 on the LIDAR chip can receive from the isolator adapter light from the second isolator output signal. The portion of the second isolator output signal received by the utility waveguide 11 can serve as the light system signal on the utility waveguide 11.

Figure 10A:
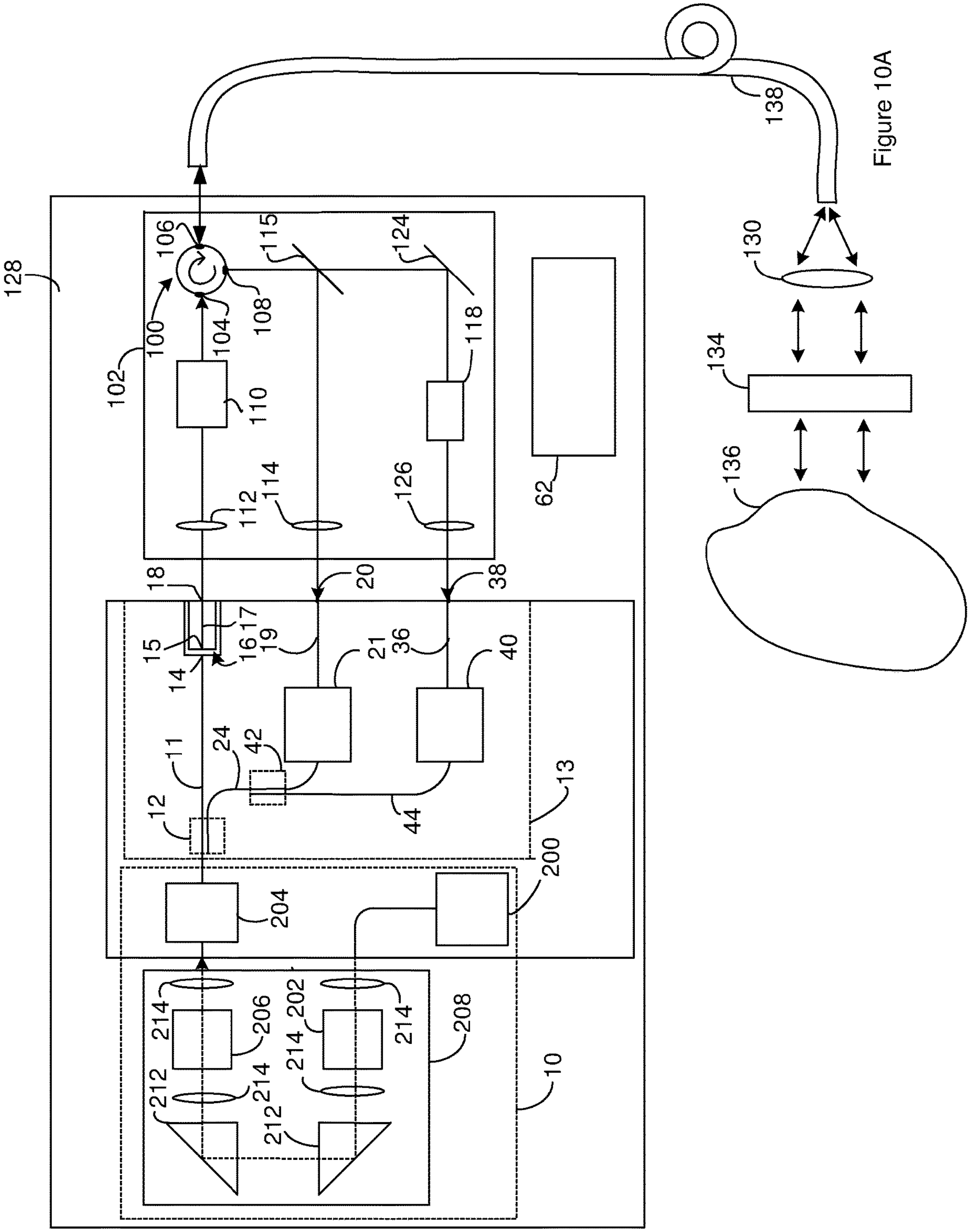
FIG. 10A is a topview of a LIDAR system that includes a LIDAR chip used in conjunction with a LIDAR adapter and an isolator adapter.

FIG. 10A illustrates the LIDAR system of FIG. 5 modified to include the isolator adapter and the light system of FIG. 9A.

Figure 10B:
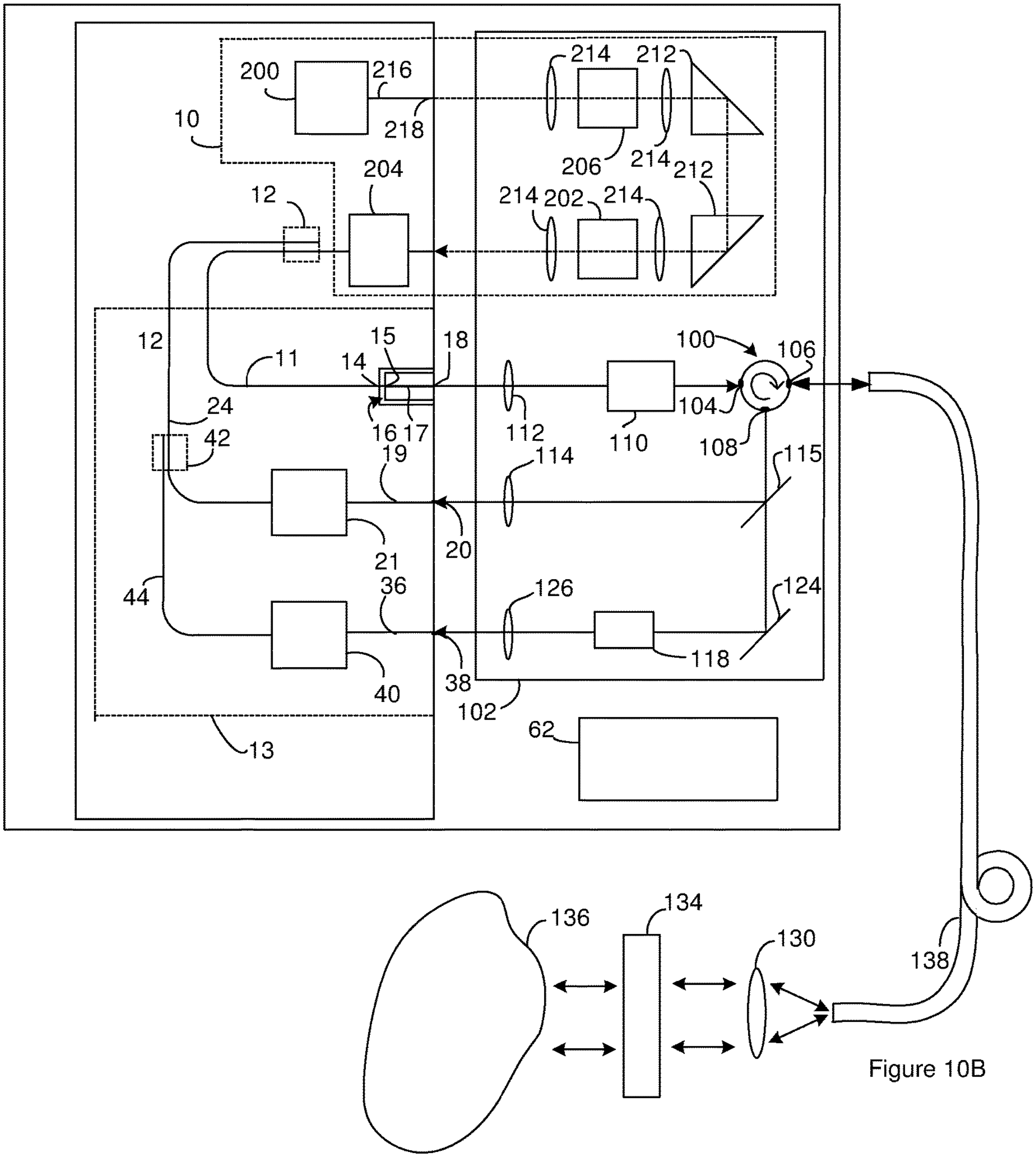
FIG. 10B is a topview of a LIDAR system that includes a LIDAR chip used in conjunction with a LIDAR adapter and an isolator adapter.

The isolator adapter can be combined with the LIDAR adapter. For instance, the optical components and/or the discrete components of the isolator adapter can be positioned on the base 102 of the LIDAR adapter. As an example, FIG. 10B illustrates the LIDAR system of FIG. 10A modified such that the optical components the isolator adapter are positioned on the base 102 of the LIDAR adapter along with the components from the LIDAR adapter. As a result, the base 102 of the LIDAR adapter can serve as the base 208 of the isolator adapter.

Figure 11:
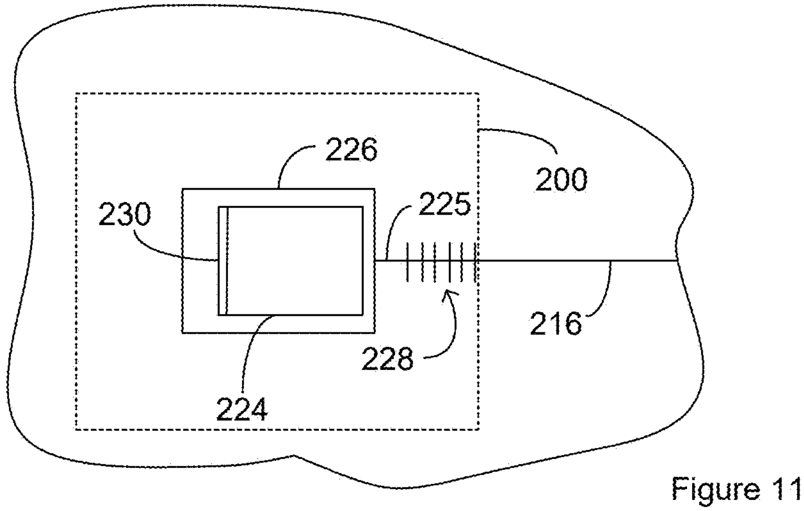
FIG. 11 is a topview of an example of a light-source that is suitable for use in the light systems of FIG. 8A through FIG. 8C.

FIG. 11 is a topview of an example of a suitable construction for a light-source. The light source 200 includes or consists of a laser cavity. The light source include or consist of a gain chip 224 for a laser. The light source includes a cavity waveguide 225 that receives a light signal from the gain chip 224. The gain chip 224 can be positioned in a recess 226 so a facet of the gain chip 224 is optically aligned with a facet of the cavity waveguide 225 to allow the gain chip 224 and cavity waveguide 225 to exchange light signals. The cavity waveguide 225 carries the light signal to a partial return device 228. The illustrated partial return device 228 is an optical grating such as a Bragg grating. However, other partial return devices can be used such as echelle gratings and arrayed waveguide gratings.

The partial return device 228 returns a portion of the light signal to the cavity waveguide 225 as a return signal. For instance, the cavity waveguide 225 returns the return signal to the gain chip 224 such that the return signal travels through a gain medium in the gain chip 224. The gain chip 224 is configured such that at least a portion of the return signal is added to the light signal that is received at the cavity waveguide 225. For instance, the gain chip 224 can include a highly, fully, or partially reflective device 230 that reflects the return signal received from the gain medium back into the gain medium. As a result, light can resonate between the partial return device 228 and the reflective device 230 so as to form a Distributed Bragg Reflector (DBR) laser cavity. A DBR laser cavity is an external cavity laser that has an inherently narrow-linewidth and a longer coherence length than DFB lasers and accordingly improves performance when an object reflecting the LIDAR output signal from the chip is located further away from the chip.

The partial return device 228 passes a portion of the light signal received from the cavity waveguide 225 to the source waveguide 216 included on the LIDAR chip. The portion of the light signal that the source waveguide 216 receives from the partial return device 228 serves as the source signal output from the light source 200.

The light source illustrated in FIG. 11 is an external cavity laser. However, the light source can have other constructions. For instance, the light source can be selected from a group consisting of a Distributed Feedback laser, a Distributed Bragg Reflector laser, a Discrete Mode laser, and an External Cavity laser. Distributed Feedback lasers, Distributed Bragg Reflector lasers, Discrete Mode lasers and External Cavity lasers are examples of light sources that provide the narrow linewidth that is desired for FMCW LIDAR systems. However, these light sources are more sensitive to back reflections than other light sources and accordingly benefit most strongly from the presence of the isolator adapter.

Figure 12:
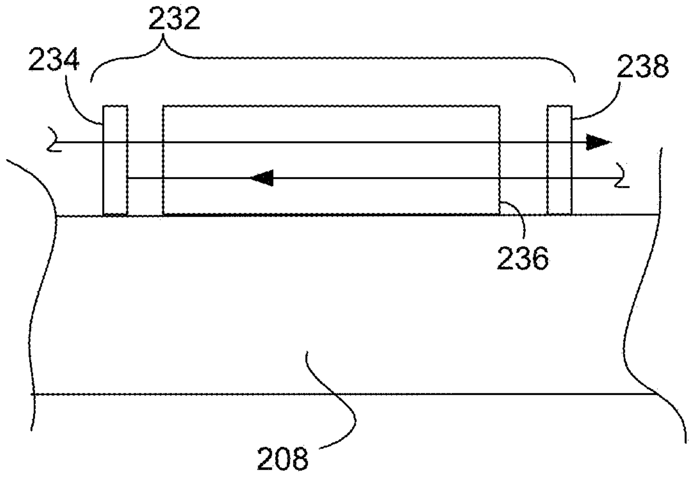
FIG. 12 is a sideview of an example of an optical isolator that is suitable for use in the light systems of FIG. 8A through FIG. 8C.

FIG. 12 illustrates an example of an isolator 232 that is suitable for use as the first optical isolator or the second optical isolator on the isolator adapter. The isolator 232 includes multiple components on the base 208 of the isolator adapter. For instance, the isolator 232 includes a first component 234, a second component 236, and a fourth component 238. The functionality of the components can change in response to the type of isolator that is desired. For instance, when the isolator 232 is a polarization dependent isolator, the first component 234 can be an input polarizer, the second component 236 can be a Faraday rotator, and the fourth component 238 can be an output polarizer such as an analyzer. When the isolator 232 is a polarization independent isolator, the first component 234 can be an input birefringent wedge, the second component 236 can be a Faraday rotator, and the fourth component 238 can be an output birefringent wedge. The isolator 232 can optionally include additional components or fewer than three components. When the isolator 232 includes a Faraday rotator, the isolator 232 can include a magnet associated with the Faraday rotator. When the isolator 232 includes a magnet, the magnet can be located on the base 208 or off the base 208. As a result, one or more of the isolator 232 components can be located off the isolator adapter.

Figure 13:
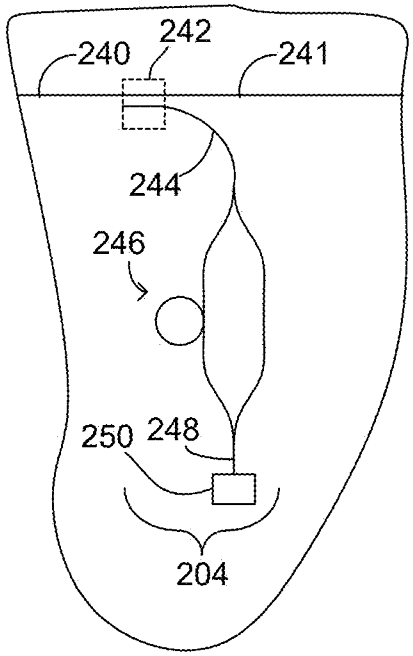
FIG. 13 is a schematic of an embodiment of a control component that is suitable for use in the light systems of FIG. 8A through FIG. 8C.

FIG. 13 illustrates an embodiment of a control component 204 that is suitable for use with the LIDAR system. The control component 204 can be arranged as shown in the example light systems of FIG. 9A, FIG. 9B, or in a different arrangement. The control component 204 receives an input signal from an input waveguide 240. For instance, when the light system is constructed as shown in FIG. 9A, the portion of the source signal carried on the LIDAR chip waveguide 215 of FIG. 9A (the second isolator output signal) can serve as the input signal on the input waveguide 240 of FIG. 13. When the light system is constructed as shown in FIG. 9B, the portion of the source signal carried on the source waveguide 216 of FIG. 9B can serve as the input signal on the input waveguide 240 of FIG. 13.

The control component 204 outputs an output signal on an output waveguide 241. When the light system is constructed as shown in FIG. 9A, the output signal on the output waveguide 241 can serve as the light system signal carried on the utility waveguide 11. Since the system output signal includes or consists of light from the light system signal, the system output signal includes or consists of light from the input signal. When the light system is constructed as shown in FIG. 9B, the output signal on the output waveguide 241 can serve as the second source signal carried on the second source waveguide 220. Since the system output signal includes or consists of light from the light system signal, the system output signal includes or consists of light from the input signal.

The control component 204 includes a directional coupler 242 that moves a portion of the input signal from the input waveguide 240 onto a control waveguide 244. The coupled portion of the input signal serves as a tapped signal. Although FIG. 13 illustrates a directional coupler 242 moving portion of the input signal onto the control waveguide 244, other signal-tapping components can be used to move a portion of the control signal from the input waveguide 240 onto the control waveguide 244. Examples of suitable signal tapping components include, but are not limited to, y-junctions, and MMIs.

The control waveguide 244 carries the tapped signal to an interferometer 246 that splits the tapped signal and then re-combines the different portions of the tapped signal with a phase differential between the portions of the tapped signal. The illustrated interferometer 246 is a Mach-Zehnder interferometer; however, other interferometers can be used.

The interferometer 246 outputs a control light signal on an interferometer waveguide 248. The interferometer waveguide 248 carries the control light signal to a control light sensor 250 that converts the control light signal to an electrical signal that serves as an electrical control signal. The interferometer signal has an intensity that is a function of the frequency of the input signal. For instance, a Mach-Zehnder interferometer will output a sinusoidal control light signal. Changes to the linearity of the chirped input signal will cause changes to the frequency of the control light signal. Accordingly, the electrical control signal output from the control light sensor 250 is a function of the linearity of the chirped input signal. Since the system output signal includes or consists of light from the input signal, the linearity of the system output signal is a function of the electrical control signal output from the control light sensor 250.

As noted above, the electronics control the frequency of the system output signal during the operation of the LIDAR system. Since the LIDAR system can include multiple LIDAR engines and each of the LIDAR engines can output light that is included in one or more system output signals, the LIDAR system can output one or more system output signals. The electronics can operate the light system 10 such that the channel carried by each of the different system output signals has a frequency versus time pattern as discussed in the context of FIG. 7C.

The electronics can use the electrical control signal in a feedback loop to provide the one or more system output signals with the desired frequency versus time pattern. As noted above, the linearity of the input signal and system output signal are controlled by monitoring of the frequency of the electrical control signal output from the control light sensor 250. Accordingly, the electronics 62 can adjust the frequency chirp rate of the system output signals in response to the frequency of the electrical control signal. For instance, while changing the frequency of the one or more system output signals during a data period, the electronics 62 can have a range of suitable values for the electrical control signal magnitude as a function of time. At multiple different times during a data period, the electronics 62 can compare the frequency of the electrical control signal to the range of values associated with the current time. If the electrical control signal frequency indicates that the frequency of the system output signal is outside the associated range of electrical control signal frequencies, the electronics 62 can operate the light source 200 so as to change the frequency of the system output signal so it falls within the associated range. If the electrical control signal frequencies indicates that the frequency of the system output signal is within the associated range of electrical control signal magnitudes, the electronics 62 do not change the frequency of the system output signal. Suitable methods for tuning the frequency of the source signal, and accordingly the system output signal, include, but are not limited to, tuning the level of electrical current through a gain element included in the light source 200, or tuning a phase shifting element incorporated within the laser cavity.

The electronics 62 can employ other feedback control loop mechanism to provide the one or more system output signals with the desired frequency versus time pattern. For instance, another suitable mechanism is disclosed in U.S. patent application Ser. No. 16/875,987, filed May 16, 2020, entitled "Monitoring Signal Chirp in LIDAR Output Signals," and incorporated herein in its entirety.

Figure 14:
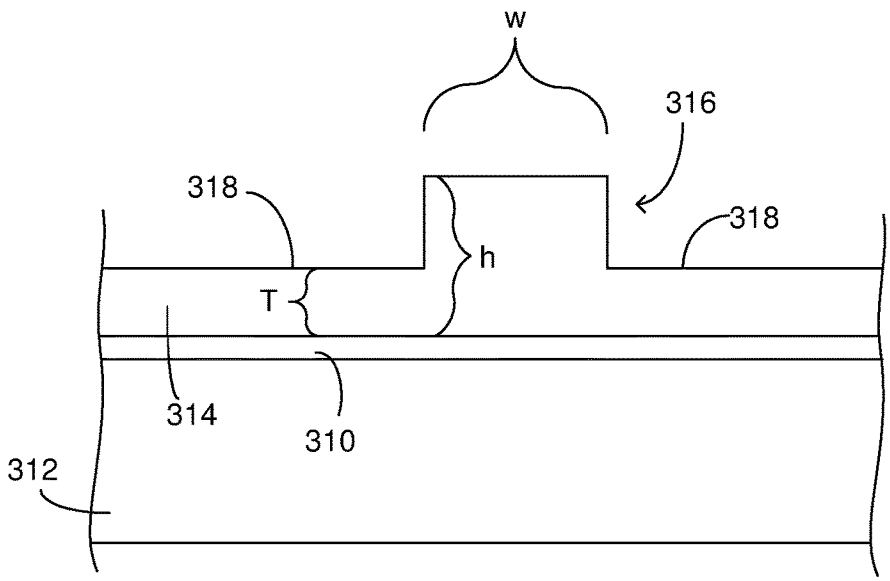
FIG. 14 is a cross-section of portion of a LIDAR chip constructed from a silicon-on-insulator wafer.

Suitable platforms for the LIDAR chips include, but are not limited to, silica, indium phosphide, and silicon-on-insulator wafers. FIG. 14 is a cross-section of portion of a LIDAR chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the above LIDAR chips can be positioned on or over the top and/or lateral sides of the substrate 312.

FIG. 14 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 14. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.1 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 14 is suitable for all or a portion of the waveguides on the above LIDAR chips.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Patent No. 61,088, 472, issued on Aug. 22, 2000 each of which is incorporated herein in its entirety. The use of light sensors that are integrated with the chip are suitable for all or a portion of the light sensors selected from the group consisting of the first light sensor and the second light sensor.

Figure 15A:
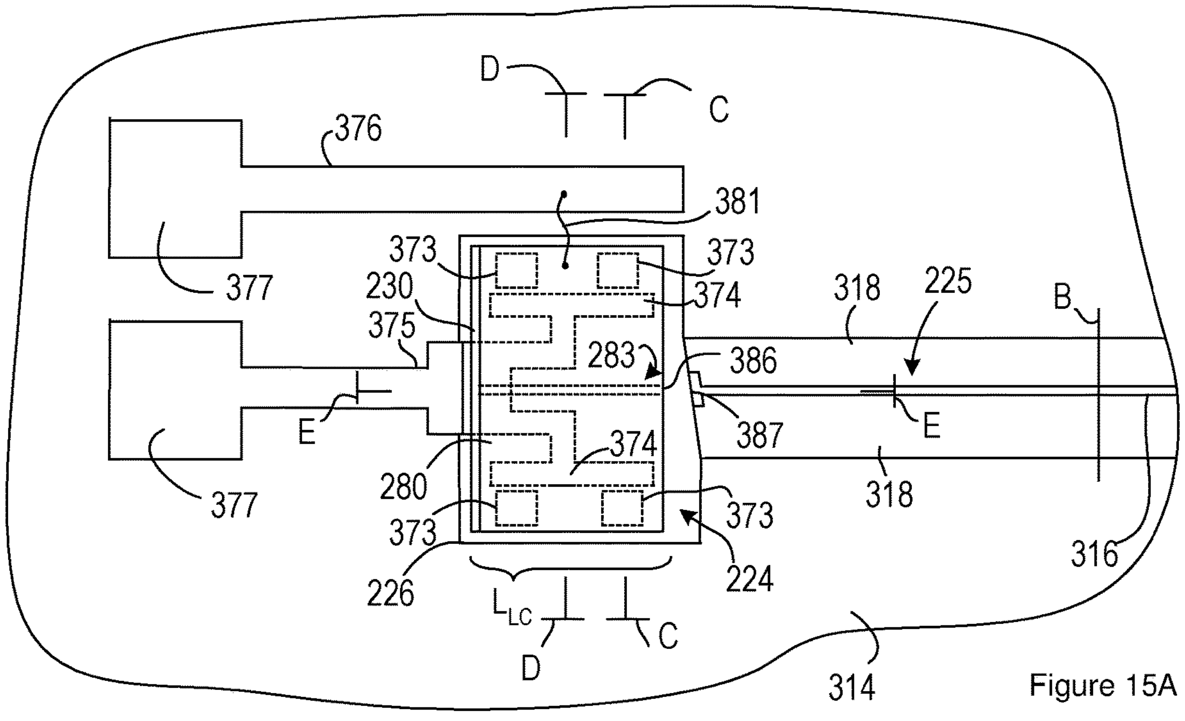
FIG. 15A through FIG. 15E illustrates an example of suitable interface between a gain chip and a waveguide.
Figure 15B:
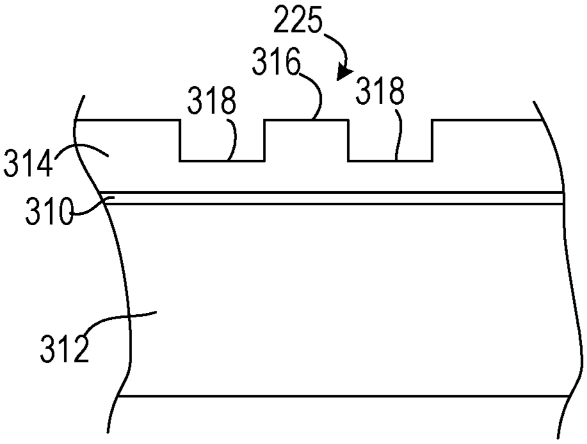
Figure 15C:
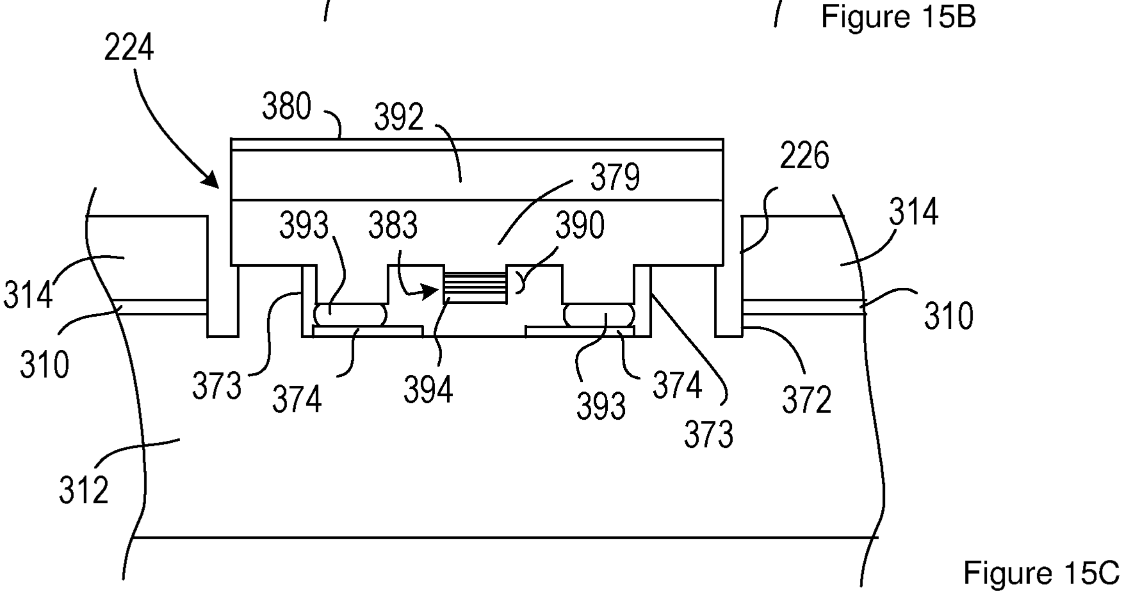
Figure 15D:
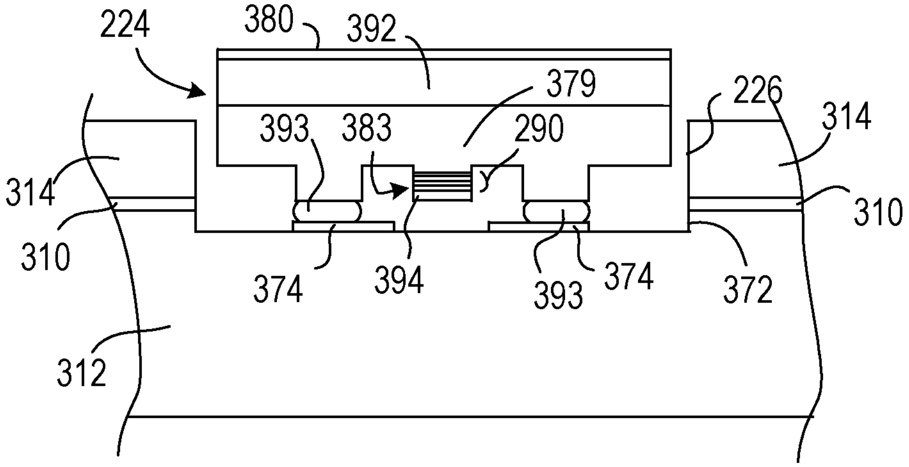
Figure 15E:
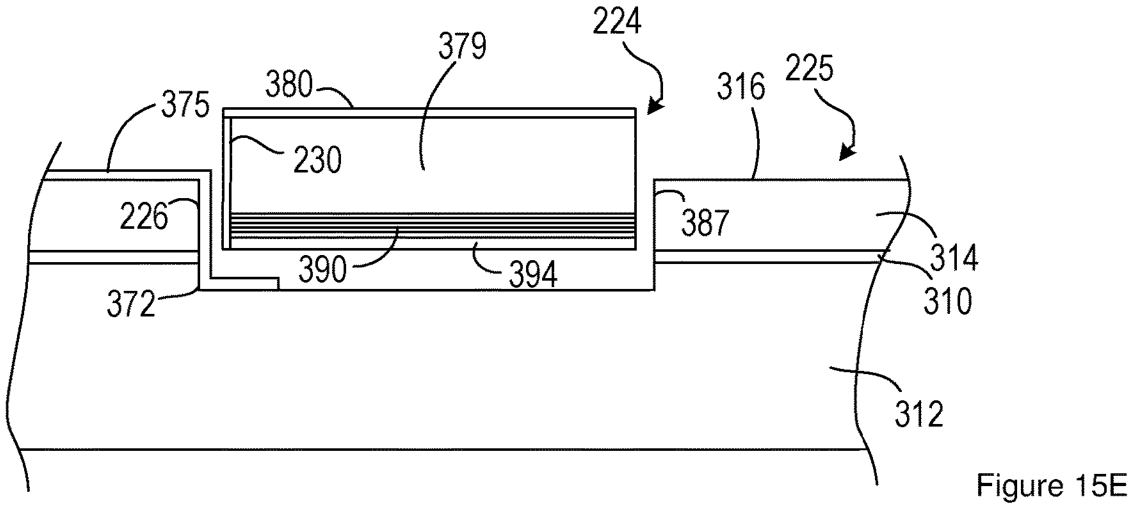

FIG. 15A through FIG. 15E illustrates an example of suitable interface between a gain chip 224 and a cavity waveguide 225 that is suitable for use with a silicon-on-insulator platform or other LIDAR chip platform. FIG. 15A is a topview of a portion of the LIDAR chip that includes the interface. FIG. 15A includes dashed lines that each illustrates a component or a portion of a component that is located beneath other components that are illustrated by solid lines. The relationship between the components illustrated by the dashed lines in FIG. 15A and the other components are also shown in FIG. 15B through FIG. 15E. FIG. 15B is a cross section of the cavity waveguide 225 shown in FIG. 15A taken along the line labeled B. The line labeled B extends through a ridge 316 of the cavity waveguide 225. Accordingly, FIG. 15B includes a cross section of the cavity waveguide 225. The waveguide can be constructed as disclosed in the context of FIG. 14. FIG. 15C is a cross section of the gain chip 224 taken along a line extending between the brackets labeled C in FIG. 15A. FIG. 15D is a cross section of the gain chip 224 taken along a line extending between the brackets labeled D in FIG. 15A. FIG. 15E is a cross section of the gain chip 224 of FIG. 15A taken along a line extending between the brackets labeled E in FIG. 15A. The LIDAR chip is illustrated as being on a silicon-on-insulator platform although other platforms are possible.

The recess 226 extends into or through the light-transmitting medium 314. In some instances where the recess 226 extends through the light-transmitting medium 314, the recess 226 can extend into or through the buried layer 310. A second recess 372 extends into the bottom of the recess 226 such that the substrate 312 includes pillars 373 extending upward from the bottom of the second recess 372. Electrical contacts 374 are positioned in the bottom of the second recess 372. A first conductor 375 on the light-transmitting medium 314 is in electrical communication with the electrical contacts 374. A second conductor 376 on the on the light-transmitting medium 314 is positioned adjacent to the recess 226. The first conductor 375 and the second conductor 376 are each in electrical communication with a contact pad 377 on the light-transmitting medium 314. The contact pads 377 can be used to provide electrical communication between electronics and the gain chip 224.

The gain chip 224 is positioned in the recess 226 and on the pillars 373. The gain chip 224 can be attached to the LIDAR chip using flip-chip technologies. Examples of suitable interfaces between laser chips and chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety.

The gain chip 224 includes a gain medium 379. A second conducting layer 380 is positioned on the gain medium 379. A third conductor 381 provides electrical communication between the second conducting layer 380 and the second conductor 376.

The gain chip 224 includes three ridges that extend into the second recess 372. The central ridge defines a portion of a gain waveguide 383. The outer ridges are each in electrical communication with one of the electrical contacts 374 through a conducting medium 393 such as solder or conducting epoxy. Since the first conductor 375 is in electrical communication with the electrical contacts 374, the first conductor 375 is in electrical communication with the outer ridges.

The light signal can be generated from the gain medium 379 by driving an electrical current through the gain medium 379. The electrical current can be generated by applying a potential difference between the first conductor 375 and the second conductor 376. The potential difference can be provided by the electronics. The electronics can be included on the device or can be separate from the device but electrically coupled with the device.

The gain chip 224 includes the reflective device 230 on the gain medium 379. In one example, the reflective device 230 is a highly reflecting structure such as a mirror. Suitable reflective devices 230 include, but are not limited to, a layer of metal on the layer of gain medium 379, or one or more dielectric layers configured as a high-reflectivity (HR) coating. The light from the gain waveguide 383 exits the gain medium 379 through a facet 386. Although not illustrated, the facet 386 can optionally include one or more anti-reflective coatings such as silicon nitride.

The gain medium 379 includes sub-layers 390 between a lower gain medium 392 and an upper gain medium 394. The lower gain medium 392 and the upper gain medium 394 can be the same or different. Suitable lower gain media 392 include, but are not limited to, InP, doped InP, gallium nitride (GaN), InGaAsP, and GaAs. Suitable upper gain media 394 include, but are not limited to, InP, InGaAsP, and GaAs. Different sub-layers 390 can have different compositions. For instance, each sub-layer 390 can have a different dopant and/or dopant concentration from the one or more neighboring sub-layers 390 and/or each of the sub-layers 390 can have a different dopant and/or dopant concentration. As an example, each sub-layer 390 can include or consists of two or more components selected from a group consisting of In, P, Ga, and As and different sub-layers 390 can have the elements present in different ratios. In another example, each sub-layer 390 includes or consists In, P and none, one, or two components selected from a group consisting of Al, Ga, and As and each of the different sub-layers 390 has these components in a different ratio. Examples of materials that include multiple elements selected from the above group include different compositions of InP with or without dopants such as In(x)P(1−x) or In—Ga—As—P. Additionally, there may be other sub-layers 390 present to compensate for stress due to lattice mismatch between the compositions of the different sub-layers 390. The location of the laser mode in the laser ridge is defined by the different sub-layers 390 as a result of the refractive indices of the different compositions. Although the gain medium is disclosed in the context of a quantum well based gain structure, other suitable semiconductor gain structures can be used such as gain media that includes or consists of quantum dots.

The electrical communication between the second conducting layer 380 and the second conductor 376 provided by the third conductor 381 can be achieved using traditional techniques such as wire bonding.

The gain chip is aligned with the cavity waveguide such that the cavity waveguide receives the light signal through an input facet 387. Although not illustrated, the input facet 387 can optionally include one or more anti-reflective coatings such as silicon nitride. The space between the input facet 387 and the facet 386 can be filled with a transmitting medium that is a solid or a fluid. For instance, the space between the facet 386 and the input facet 387 can be filled with an epoxy, air, or gel. As a result, the laser signal can travel directly between the gain chip 224 and the input facet 387 through the transmissive medium.

The input facet 387 for the waveguide can be angled at less than ninety degrees relative to the direction of propagation in the gain waveguide 383. Angling the input facet 387 at less than ninety degrees can cause light signals reflected at the input facet 387 to be reflected out of the waveguide and can accordingly reduce issues associated with back reflection. Additionally or alternately, a facet of the gain waveguide 383 can be angled at less than ninety degrees relative to the direction of propagation in the gain waveguide 383.

Figure 16:
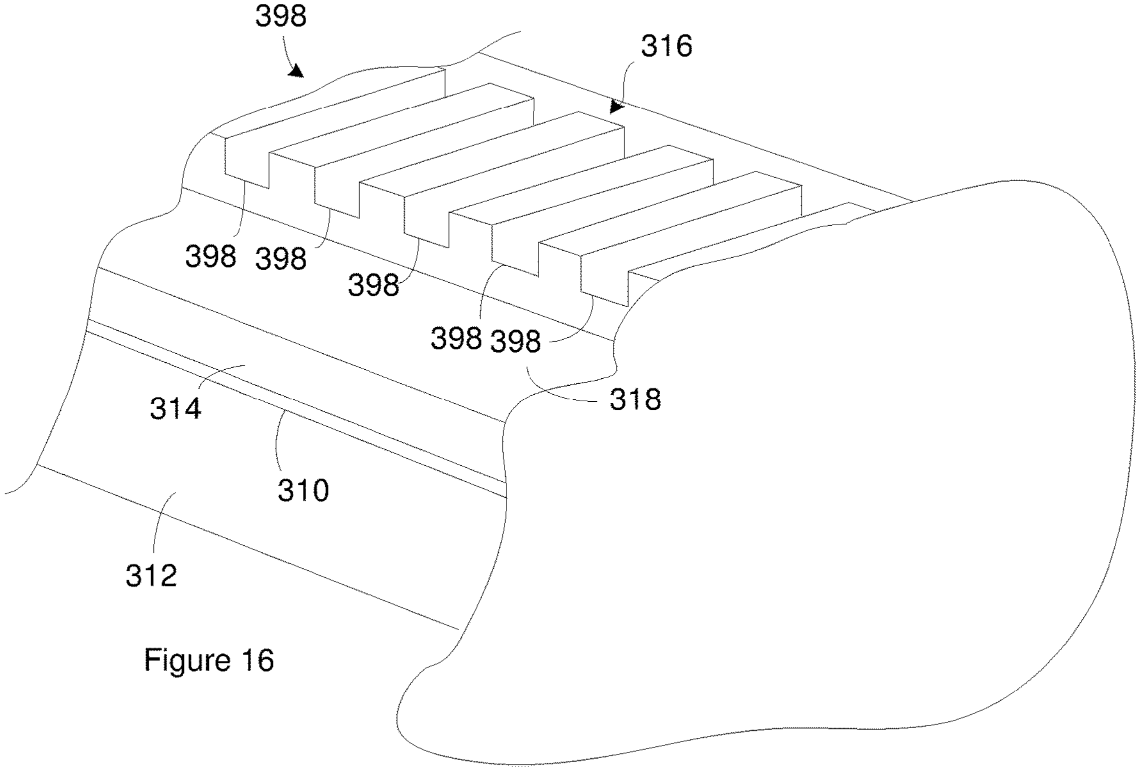
FIG. 16 is a perspective view of a portion of a partial return device suitable for use in a light source.

FIG. 16 is a perspective view of a portion of a partial return device 228 such as a Bragg grating. The illustrated partial return device 228 is illustrated on a silicon-on-insulator wafer and is suitable for use with a waveguide constructed according to FIG. 14. The partial return device includes grooves 398 that extend into the top of a ridge 316 of a waveguide. However, the grooves 398 can extend into different locations such as one or more locations selected from the group consisting of the lateral sides of the ridge 316, slab regions 318, and top of the ridge.

Figure 17A:
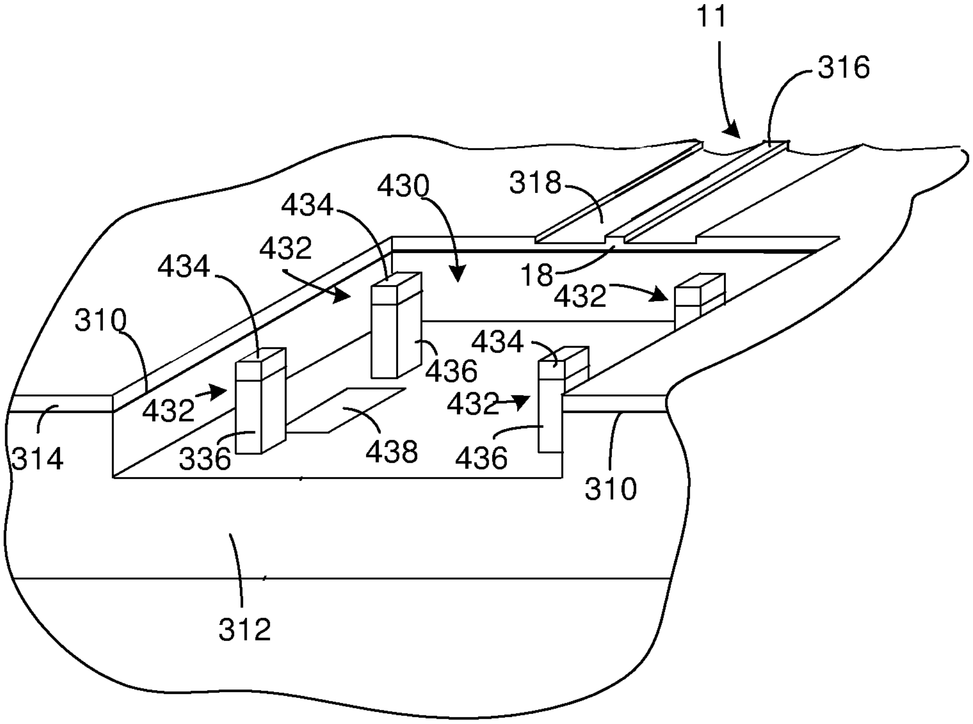
FIG. 17A is a perspective view of a portion of a LIDAR chip that includes an interface for optically coupling a LIDAR chip with an amplifier chip.

FIG. 17A is a perspective view of a portion of a LIDAR chip that includes an interface for optically coupling the LIDAR chip with an amplifier chip. The amplifier chip is suitable for use as the optical amplifier 16 and/or as the amplifier 110. The illustrated portion of the LIDAR chip includes a stop recess 430 sized to receive the auxiliary device. The stop recess 430 extends through the light-transmitting medium 314. In the illustrated version, the stop recess 430 extends through the light-transmitting medium 314, the buried layer 310, and into the substrate 312.

The facet 14 of the utility waveguide 11 serves as a lateral side of the stop recess 430. Although not shown, the facet 14 of the utility waveguide 11 can include an anti-reflective coating. A suitable anti-reflective coating includes, but is not limited to, single-layer coatings such as silicon nitride or aluminum oxide, or multi-layer coatings, which may contain silicon nitride, aluminum oxide, and/or silica.

One or more stops 432 extend upward from a bottom of the stop recess 430. For instance, FIG. 17A illustrates four stops 432 extending upward from the bottom of the stop recess 430. The stops 432 include a cladding 434 positioned on a base portion 436. The substrate 312 can serve as the base portion 436 of the stops 432 and the stop 432 can exclude the buried layer 310. The portion of the substrate 312 included in the stops 432 can extend from the bottom of the stop recess 430 up to the level of the buried layer 310. For instance, the stops 432 can be formed by etching through the buried layer 310 and using the underlying substrate 312 as an etch-stop. As a result, the location of the top of the base portion 436 relative to the optical mode of a light signal in the utility waveguide 11 is well known because the buried layer 82 defines the bottom of the second waveguide and the top of the base portion 436 is located immediately below the buried layer 310. The cladding 434 can be formed on base portion 436 of the stops 432 so as to provide the stops 432 with a height that will provide the desired alignment between the utility waveguide 11 and an amplifier waveguide on an amplifier chip.

Attachment pads 438 are positioned on the bottom of the stop recess 430. The attachment pads 438 can be used to immobilize the amplifier chip relative to the LIDAR chip once the amplifier chip is positioned on the LIDAR chip. In some instances, the attachment pads 438 also provide electrical communication between the LIDAR chip and one or more amplifiers on an amplifier chip. Suitable attachment pads 438 include, but are not limited to, solder pads.

Figure 17B:
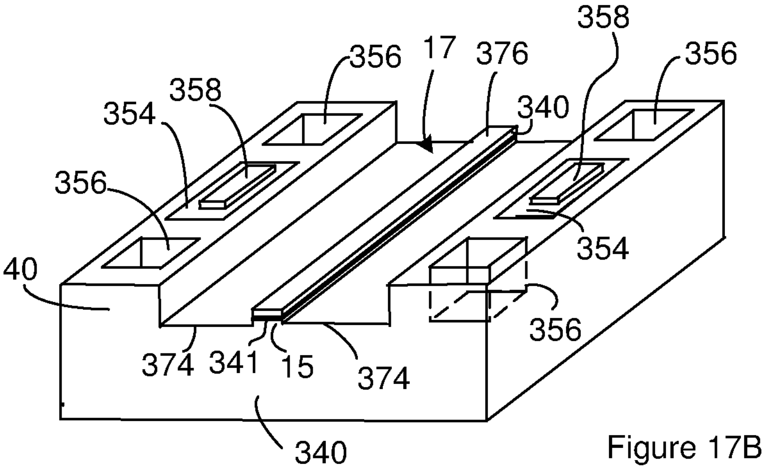
FIG. 17B is a perspective view of one embodiment of an amplifier chip.

FIG. 17B is a perspective view of one embodiment of an amplifier chip. The illustrated amplifier chip is within the class of devices known as planar optical devices. The amplifier chip includes an amplifier waveguide 17 defined in a gain medium 440. Suitable gain media include, but are not limited to, InP, InGaAsP, and GaAs.

Trenches 474 extending into the gain medium 440 define a ridge 476 in the gain medium 440. The ridge 476 defines the amplifier waveguide 17. In some instances, the gain medium 440 includes one or more layers 441 in the ridge and/or extending across the ridge 476. The one or more layers 441 can be positioned between different regions of the gain medium 440. The region of the gain medium 440 above the one or more layers 441 can be the same as or different from the region of the gain medium 440 below the one or more layers 441. The layers can be selected to constrain light signals guided through the amplifier waveguide 17 to a particular location relative to the ridge 476. Each of the layers 441 can have a different composition of a material that includes or consists of two or more components of selected from a group consisting of In, P, Ga, and As. In one example, the gain medium 440 is InP and the one or more layers 441 each includes Ga and As in different ratios.

The amplifier waveguide 17 provides an optical pathway between the first facet 15 and the second facet 18. Although not shown, the first facet 15 and/or the second facet 18 can optionally include an anti-reflective coating. A suitable anti-reflective coating includes, but is not limited to, single-layer coatings such as silicon nitride or aluminum oxide, or multi-layer coatings that may contain silicon nitride, aluminum oxide, and/or silica.

The amplifier chip includes one or more attachment pads 454 that can be employed to immobilize the amplifier chip relative to the LIDAR chip. Suitable attachment pads 454 include, but are not limited to, solder pads.

The amplifier chip also includes one or more alignment recesses 456. The dashed lines in FIG. 17B show the depth and shape of one of the alignment recesses 456.

Figure 17C:
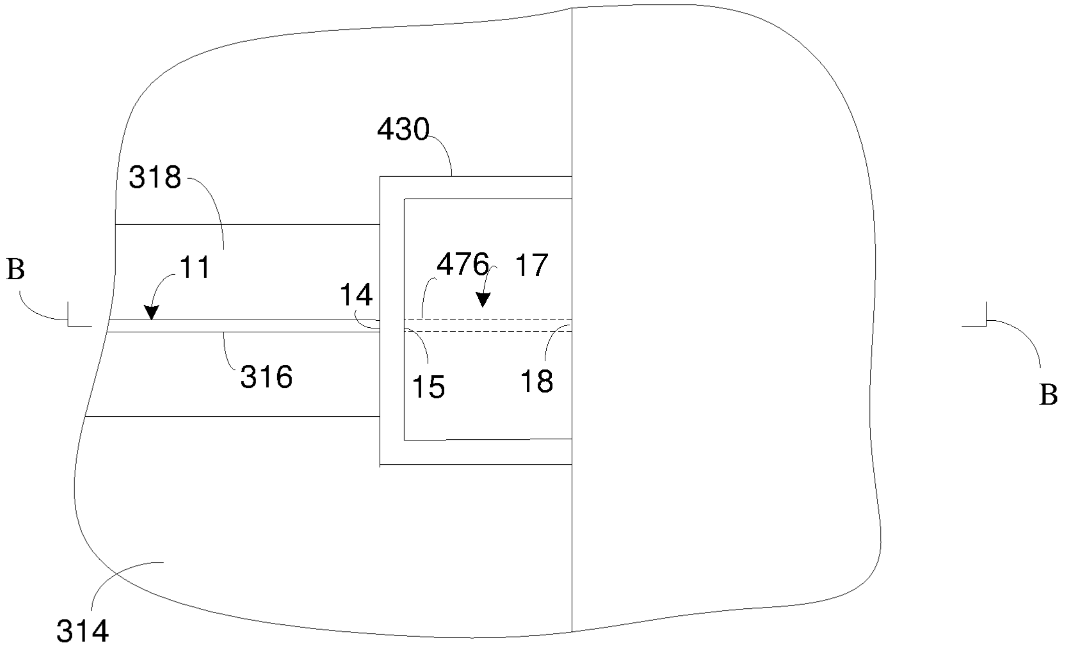
FIG. 17C and FIG. 17D illustrate a portion of a LIDAR system that includes the LIDAR chip of FIG. 17A interface with the amplifier chip of FIG. 17B.
Figure 17D:
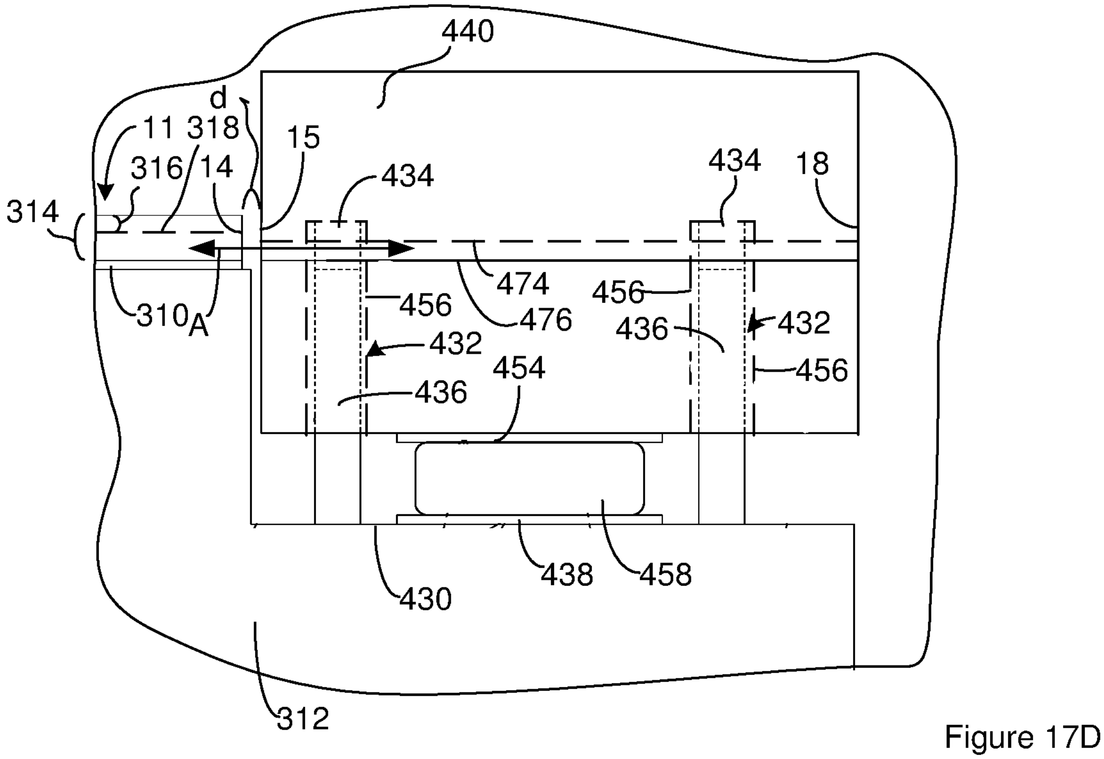

FIG. 17C and FIG. 17D illustrate a portion of a LIDAR system that includes the LIDAR chip of FIG. 17A interface with the amplifier chip of FIG. 17B. FIG. 17C is a topview of the LIDAR system. FIG. 17D is a sideview of a cross section of the system taken through the utility waveguide 11 on the LIDAR chip and the amplifier waveguide 17 on the amplifier chip. For instance, the cross section of FIG. 17D can be taken along a line extending through the brackets labeled B in FIG. 17C. FIG. 17C and FIG. 17D each includes dashed lines that illustrate features that are located behind other features in the system. For instance, FIG. 17C includes dashed lines showing the ridge 476 of the amplifier waveguide 17 even though the ridge 476 is located under the gain medium 440. Additionally, FIG. 17D includes dashed lines that illustrate the locations of the portion of the stops 432 and alignment recesses 456 located behind the ridge 476 of the amplifier waveguide 17. FIG. 17D also includes dashed lines that illustrate the location where the ridge 316 of the utility waveguide 11 interfaces with the slab regions 318 that define the utility waveguide 11 also dashed lines that illustrate the location where the ridge 476 of the amplifier waveguide 17 interfaces with slab regions 474 of the amplifier chip.

The amplifier chip is positioned in the stop recess 430 on the LIDAR chip. The amplifier chip is positioned such that the ridge 476 of the amplifier waveguide 17 is located between the bottom of the amplifier chip and the bottom of the LIDAR chip. Accordingly, the amplifier chip is inverted in the stop recess 430. Solder or other adhesive 458 contacts the attachment pads 438 on the bottom of the stop recess 430 and the attachment pads 454 on the amplifier chip. For instance, the solder or other adhesive 458 extends from an attachment pad 438 on the bottom of the stop recess 430 to an attachment pad 454 on the auxiliary device. Accordingly, the solder or other adhesive 458 immobilizes the auxiliary device relative to the LIDAR chip.

The facet 14 of the utility waveguide 11 is aligned with the first facet 15 of the amplifier waveguide 17 such that the utility waveguide 11 and the amplifier waveguide 17 can exchange light signals. As shown by the line labeled A, the system provides a horizontal transition path in that the direction that light signals travel between the LIDAR chip and the amplifier chip is parallel or is substantially parallel relative to an upper and/or lower surface of the substrate 312. A top of the first facet 15 of the amplifier waveguide 17 is at a level that is below the top of the facet 18 of the utility waveguide.

The one or more stops 432 on the LIDAR chip are each received within one of the alignment recesses 456 on the auxiliary device. The top of each stop 432 contacts the bottom of the alignment recess 456. As a result, the interaction between stops 432 and the bottom of the alignment recesses 456 prevent additional movement of the amplifier chip toward the LIDAR chip. In some instances, the auxiliary device rests on top of the stops 432.

As is evident from FIG. 17D, the first facet 15 of the amplifier waveguide 17 is vertically aligned with the facet 14 of the utility waveguide 11 on the LIDAR chip. As is evident from FIG. 17C, the first facet 15 of the amplifier waveguide 17 is horizontally aligned with the facet 14 of the utility waveguide 11 on the LIDAR chip. The horizontal alignment can be achieved by alignment of marks and/or features on the amplifier chip and the LIDAR chip.

The vertical alignment can be achieved by controlling the height of the stops 432 on the LIDAR chip. For instance, the cladding 434 on the base portion 436 of the stops 432 can be grown to the height that places the first facet 15 of the amplifier waveguide 17 at a particular height relative to the facet 14 of the utility waveguide 11 on the LIDAR chip. The desired cladding 434 thickness can be accurately achieved by using deposition techniques such as evaporation, plasma enhanced chemical vapor deposition (PECVD), and/or sputtering to deposit the one or more cladding layers. As a result, one or more cladding layers can be deposited on the base portion 436 of the stops 432 so as to form the stops 432 to a height that provides the desired vertical alignment. Suitable materials for layers of the cladding 434 include, but are not limited to, silica, silicon nitride, and polymers.

In FIG. 17D, the first facet 15 is spaced apart from the facet 18 by a distance labeled D. Since the amplifier waveguide is optically aligned with only one waveguide, the first facet 15 can be closer to the facet 18 than was possible with prior configurations. For instance, the distance between the first facet 15 and the facet 18 can be less than 5 μm, 3 μm, or 1 μm and/or greater than 0.0 μm. In FIG. 17D, the atmosphere in which the LIDAR chip is positioned is located in the gap between the first facet 15 and the facet 18; however, other gap materials can be positioned in the gap. For instance, a solid gap material can be positioned in the gap. Examples of suitable gap materials include, but are not limited to, epoxies and polymers.

One or more facets selected from the group consisting of the facet 14, the first facet 15, and the second facet 18 can have a non-perpendicular angle relative to the direction of propagation of the waveguide that terminates at the facet. For instance, FIG. 12A is a topview of the system of FIG. 17C modified such that the second facet 18 is at an angle β relative to a direction of propagation of a light signal through the utility waveguide 11 at the facet 14. The direction of propagation of a light signal along an optical path through the utility waveguide 11 and the amplifier waveguide 17 is shown by the dashed line labeled $d_{prop}$. FIG. 12A also shows that the first facet 15 is at an angle δ relative to a direction of propagation of a light signal through the amplifier waveguide 17 at the first facet 15 and that the second facet 18 is at an angle ε relative to a direction of propagation of a light signal through the amplifier waveguide 17 at the second facet 18. As is evident in FIG. 17D, in some instances, one or more facets selected from the group consisting of the facet 18, the first facet 15, and the second facet 18 are perpendicular to a plane of the LIDAR chip such as the bottom of the LIDAR chip. For instance, one or more facets selected from the group consisting of the facet 18, the first facet 15, and the second facet 18 are perpendicular to a substrate such as a plane of the buried layer 82, the substrate 84, or of the amplifier 20.

All or a portion of the components on the LIDAR chip can be immobilized on the LIDAR chip. For instance, flip-chip components can be immobilized on the LIDAR chips with adhesives, epoxies, and solder. As an example, the gain chip disclosed in the context of FIG. 15A through FIG. 15E can be immobilized on the LIDAR chip with solder or conducting epoxy. Additionally, a portion of a silicon-on-insulator wafer (the light-transmitting medium 314 and buried layer 310) serves as the waveguides constructed as disclosed in the context of FIG. 14.

Figure 18:
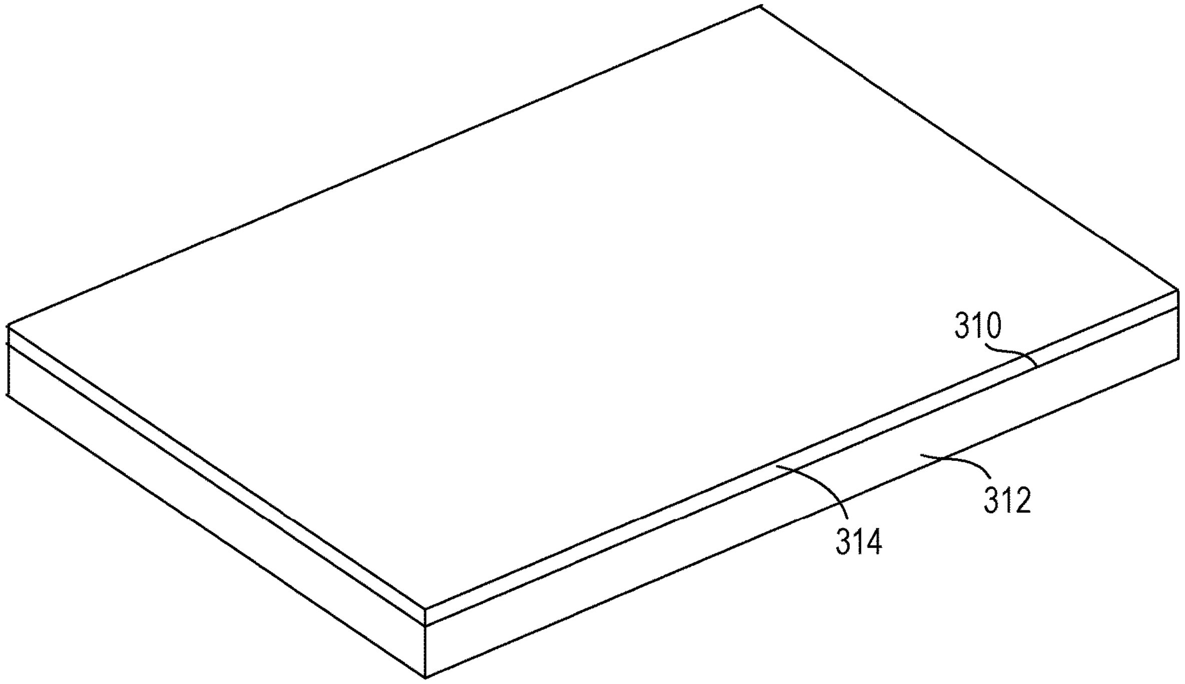
FIG. 18 is a perspective view of a wafer that can serve as a platform for a LIDAR chip.

Components on the LIDAR chip can be fully or partially integrated with the LIDAR chip. For instance, the integrated optical components can include or consist of a portion of the wafer from which the LIDAR chip is fabricated. A wafer that can serve as a platform for a LIDAR chip can include multiple layers of material. At least a portion of the different layers can be different materials. As an example, FIG. 18 is a perspective view of a wafer that can serve as the platform for the LIDAR chip. Although the wafer is illustrated as having a rectangular shape, the wafer can have the shape of a disc. The illustrated wafer is a silicon-on-insulator wafer that includes the buried layer 310 between the substrate 312 and the light-transmitting medium 314. The integrated on-chip components can be formed by using etching and masking techniques to define the features of the component in the light-transmitting medium 314. For instance, the slab regions 318 that define the waveguides and the recess 410 of the redirection component can be formed in the desired regions of the wafer using different etches of the wafer. As a result, the LIDAR chip includes a portion of the wafer and the integrated on-chip components can each include or consist of a portion of the wafer. Further, the integrated on-chip components can be configured such that light signals traveling through the component travel through one or more of the layers that was originally included in the wafer. For instance, the waveguide of FIG. 14 guides light signal through the light-transmitting medium 314 from the wafer. The integrated components can optionally include materials in addition to the materials that were present on the wafer. For instance, the integrated components can include reflective materials and/or a cladding.

The components on the LIDAR adapter and/or the isolator adapter need not be integrated. For instance, the components on the LIDAR adapter and/or the isolator adapter need not include materials from the base 208, the base 102 and/or from the common mount 128. In some instances, all of the components on the LIDAR adapter and/or the isolator adapter are separate from the base 208, the base 102 and/or from the common mount 128. For instance, the components on the LIDAR adapter and/or the isolator adapter can be constructed such that the light signals processed by the LIDAR adapter and/or the isolator adapter do not travel through any portion of the base 208, the base 102 and/or the common mount 128.

All or a portion of the LIDAR chip components can be passive components in that they do not require electrical input and exclude moving parts. For instance, a the light source 200 is an example of active component that can be on-chip component while the waveguides on the LIDAR chip, the partial return device are examples of components that can be passive on-chip components. Accordingly, all or a portion of the LIDAR chip components can be passive on-chip components that include or consist of a portion of the wafer.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the LIDAR system has been disclosed as including a LIDAR chip that has both a light source and an amplifier where the amplifier causes de-stabilization of the light source; there are other optical components or combinations of optical components that can cause enough back reflection for the isolator adapter to be desirable. As a result, an amplifier need not be present on the LIDAR chip for the LIDAR chip to be used with an isolator adapter.

Although the isolator adapter is disclosed in the context of a LIDAR system, the isolator adapter can be included in other systems with integrated optical chips such as Photonic Integrated Circuit chips. For instance, a Photonic Integrated Circuit chip that includes integrated waveguides such as ridge waveguides, strip-loaded waveguides diffused waveguide or buried waveguides. The isolator on the isolator adapter can be configured to receive an adapter signal that includes or consists or light from a source signal that exited from the Photonic Integrated Circuit chip before being received by the optical isolator. The isolator can output light from the adapter signal in an isolator output signal. One or more of the waveguides on the Photonic Integrated Circuit chip can guide a light signal that includes light from the isolator output signal. Examples of such systems include, but are not limited to, optical transceivers, chemical sensors, and biochemical sensors.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
- a LIDAR chip that includes a light source configured to output a source signal, the LIDAR chip configured to output a LIDAR output signal that exits from the LIDAR chip;
- an isolator adapter that includes an optical isolator configured to receive an adapter signal,
  - the adapter signal including light from the source signal that has exited from the LIDAR chip before being received by the optical isolator,
  - the optical isolator configured to output light from the adapter signal in an isolator output signal, and
  - the LIDAR output signal including light from the isolator output signal;
- the LIDAR chip being configured to receive an adapter output signal from the isolator adapter, the adapter output signal includes light from the isolator output signal, and the LIDAR output signal including light from the adapter output signal; and
- the LIDAR system configured to output a system output signal that includes light from the LIDAR output signal and also configured to receive a LIDAR input signal that includes light from the system output signal after light from the system output signal was reflected by an object located outside of the LIDAR system.

2. The system of claim 1, wherein the LIDAR chip includes multiple waveguides arranged in a Photonic Integrated Circuit.

3. The system of claim 1, wherein the LIDAR chip is constructed on a silicon-on-insulator platform.

4. The system of claim 1, wherein the isolator adapter is separate from the LIDAR chip.

5. The system of claim 1, wherein the isolator adapter includes multiple adapter discrete optical components attached to a base.

6. The system of claim 1, wherein the LIDAR chip includes multiple optical components integrated with a common platform and at least a portion of the optical components guide light through a portion of the common platform, and
- wherein the isolator adapter includes multiple adapter components on a base and none of the adapter components guides light through the base.

7. The system of claim 1, wherein the light source is selected from a group consisting of a Distributed Feedback laser, a Distributed Bragg Reflector laser and an External Cavity laser.

8. The system of claim 1, wherein the LIDAR chip includes an optical amplifier configured to receive a light signal that includes light from the isolator output signal,
- the amplifier configured to output an amplified light signal, and
- the LIDAR output signal including light from the amplified light signal.

9. The system of claim 1, further comprising:
- electronics configured to use light from the LIDAR input signal received by the LIDAR chip to generate LIDAR data that indicates a distance and/or radial velocity between the LIDAR system and an object located outside of the LIDAR system.

10. The system of claim 1, wherein the isolator adapter includes the optical isolator positioned on a base and at least one lens positioned on the base.

11. The system of claim 1, wherein the isolator adapter includes the optical isolator positioned on a base and at least one mirror positioned on the base.

12. The system of claim 1, wherein the isolator adapter excludes waveguides and the LIDAR chip includes waveguides.

13. The system of claim 1, wherein the isolator adapter includes optical components arranged such that light signals traveling between the optical components travel through free space for a distance more than 0.1 mm.

14. The system of claim 1, wherein the LIDAR chip excludes free space regions.

15. The system of claim 1, wherein the LIDAR chip includes optical components through which light signals travel, the components being arranged such that the light signals do not travel in a free space region with a length more than 1 mm.

16. The system of claim 1, wherein the isolator adapter includes optical components arranged such that light signals traveling between the optical components travel through free space for a distance more than 0.1 mm and the LIDAR chip includes second optical components arranged such that light signals traveling between the second optical components does not travel through free space for a distance more than 1 micron.

* * * * *